US006874141B1

(12) United States Patent
Swamy et al.

(10) Patent No.: US 6,874,141 B1
(45) Date of Patent: Mar. 29, 2005

(54) METHOD OF COMPILING SCHEMA MAPPING

(75) Inventors: Shekhar N. Swamy, Bellevue, WA (US); William R. Taylor, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 09/607,560

(22) Filed: Jun. 29, 2000

(51) Int. Cl.[7] ............................ G06F 9/45; G06F 17/00
(52) U.S. Cl. ..................................... 717/144; 715/513
(58) Field of Search ................................ 717/106, 109, 717/142, 143, 144; 709/102, 101; 715/513

(56) References Cited

U.S. PATENT DOCUMENTS

| 5,629,846 | A  |   | 5/1997  | Crapo |
| 5,768,564 | A  | * | 6/1998  | Andrews et al. ............ 717/137 |
| 5,808,615 | A  |   | 9/1998  | Hill et al. |
| 6,006,242 | A  | * | 12/1999 | Poole et al. ................. 715/531 |
| 6,061,513 | A  | * | 5/2000  | Scandura ..................... 717/142 |
| 6,480,206 | B2 | * | 11/2002 | Prinzing ...................... 345/762 |

OTHER PUBLICATIONS

Alfred V. Aho et al., "Compilers: Principles, Techniques and Tools," 1986, Addison–Wesley, pp. i, ii, 396, 397, 533, 534.*
Alberto Bellina, "XmlTool documentation," [online] Jan. 21, 2000 [accessed Feb. 5, 2003], Retrieved from Internet <URL: http://www.abspace.it/XmlTool/xmitool/xmitool.htm>, pp. 1–23.*

Greger Lindén, "Structured Document Transformations," 1997, University of Helsinki, Finland, Series of Publications A, Report A–1997–2, pp. i–vi, 1–122.*

Sebastian Maneth and Frank Neven, "Structured document transformations based on XSL," Proceedings of the Eighth International Workshop on Database Programming Languages, DBPL'99, Kinloch Rannoch, Scotland, 2000, pp. 1–16.*

Malcolm Wallace and Colin Runciman, "Haskell and XML: Generic Combinators or Type–Baed Translation," ACM SIGPLAN Notices, Proceedings of the 4th ACM SIGPLAN International conference on Functional programming, Sep. 1999, vol. 34, Issue 9, pp. 148–159.*

* cited by examiner

*Primary Examiner*—Wei Y. Zhen
*Assistant Examiner*—Eric B. Kiss
(74) *Attorney, Agent, or Firm*—Amin & Turocy LLP

(57) ABSTRACT

A method for compiling a mapping between a source schema and a target schema is provided. The method comprises multiple passes, including determining source node dependencies, matching hierarchy, and generating code. The method may further comprise initializing node dependency memory prior to determining source node dependencies, and freeing node dependency memory after code generation. The compiler algorithm provides for compiling user-defined functions in the mapping into the compiled representation. Another aspect of the invention provides for generating an XSL code representation of the mapping. An XSL style sheet representation may thus be generated from a visual mapping in accordance with the invention.

32 Claims, 29 Drawing Sheets

METHOD OF COMPILING SCHEMA MAPPING

TECHNICAL FIELD

The present invention relates to mapping source schemas with target schemas. More particularly, the invention relates to a method of compiling a mapping between a source schema with a target schema in computer systems.

BACKGROUND OF THE INVENTION

The internet is enabling businesses to develop new ways to facilitate efficient and automated interactions between their own internal line of business, productivity and knowledge management applications, the applications used by their customers and trading partners, and services provided by their commercial and corporate providers. The challenges associated with enabling such efficient and automated interactions between applications across business boundaries in a cost effective manner are similar to those associated with enabling them within an enterprise or departmental boundary. Building business-to-business (B2B) e-commerce systems present many challenges to the system architect. Often, each company involved stores their data and documents in formats that are different from the formats used by the other participating companies. These companies need a way to integrate what tend to be vastly different systems. In addition, Internet security issues are involved in business to business data interchange. Thus, several challenges are faced by businesses, governments, and other entities wishing to interact via electronic documents and other forms of electronic commerce.

The challenges to interaction across business boundaries include lack of a sufficiently flexible and rich universal language to specify, package, publish, and exchange both structured and unstructured information across application or business boundaries, lack of a flexible and rich universal language to specify, package, publish, and execute transformation rules to convert information from one format to the other as application and business boundaries are crossed, and lack of middleware-neutral application level communication protocols to enable automated interactions across application or business boundaries. The eXtensible Markup Language (XML), and XML-based schema languages enable businesses and other users to describe and exchange structured information between collaborating applications or business partners in a platform and middleware neutral manner.

Domain specific standards bodies and industry initiatives have started to adopt XML and XML-based schema languages to specify both their vocabularies and content models. These schemas are becoming widely published and implemented to facilitate communication between both applications and businesses. Wide support of XML has also resulted in independent solution providers developing solutions that enable the exchange of XML-based information with other external 3$^{rd}$ party or custom developed applications. Several solution or middleware/platform specific approaches have been take to address the lack of middleware-neutral application level communication protocols.

However, no single proprietary solution or middleware platform meets all the needs of a complex deployment environment. In addition, the cost and complexity of integrating together ERP systems, inventory management systems, or sales tracking systems within a single organization strains the capabilities of most large and small companies alike. In the near future, electronic commerce is going to require massive amounts of application integration across multiple organizations, as trading partners turn to the Internet to automate supply chains, forecasting systems, and government services, and new types of business interchanges.

Although XML provides a standardized format for document definition, current development tools require system developers to create code for mapping individual source document schemas with target schemas in order to facilitate the interchange of information between business organizations or entities. In a typical example, two companies may create schemas for their documents in XML. Where these companies want to exchange information via internal documents, an XML schema is created for documents at each company, and a system developer generates code mapping information transfer between the source and target document schemas. Such mapping code may be developed in a language such as eXtensible Sheetstyle Language (XSL). A developer may thus create an XSL style sheet representation of a mapping between source and target schemas.

XSL at its most basic provides a capability similar to a "mail merge." An XSL style sheet contains a template of the desired target structure, and identifies data in the source document to insert into this template. This model for merging data and templates is referred to as the template-driven model and works well on regular and repetitive data. XSL also provides capabilities for handling highly irregular and recursive data such as is typical in documents. Template fragments are defined, and the XSL processor combines the results of these fragments into a final result tree based on the shape of the source data. Each template fragment declares the type and context of source nodes it is appropriate for, allowing the XSL processor to match source nodes with template fragments. This model is known as the data-driven model since the shape of the data drives the shape of the final output. An XSL transformation process is thus independent of any particular output grammar and can be used for translating XML data from one schema to another.

Heretofore, system developers have provided code defining the interrelationships between XML business documents, based on the desired information to be exchanged via electronic commerce applications. However, for each source and target document set, code must be written mapping the relationships therebetween. Whether the code representing such a mapping is written in XSL or another language, writing this code is difficult and typically beyond the capabilities of ordinary business personnel. Improved tools are needed for business personnel to define document mappings for business to business applications, as well as to generate mapping code, which do not require extensive knowledge of software programming.

SUMMARY OF THE INVENTION

A method and system are provided for compiling a mapping between two documents or schemas, which generates a coded mapping. The invention takes a user-defined mapping between a source schema representing the definition of a source document, and a target schema representing a target document, and compiles the mapping into code for execution in a computer system. The represented documents may be XML documents, and the generated code may be, for example, extensible sheetstyle language (XSL). The mapping may be defined, for example, graphically using a graphical user interface, which the compiler system and method of the invention uses to generate code. In this way, an unsophisticated user may define relationships between business documents used across business and/or application boundaries, and generate code capable of handling the information transfers therebetween, without having extensive knowledge of computer programming languages.

In accordance with one aspect of the invention, there is provided a method of generating code representing a mapping between a source schema and a target schema. The mapping includes data transformations from the source schema to the target schema. The source schema includes a source tree having one or more source nodes and the target schema includes a target tree having one or more target nodes. The method comprises determining source node dependencies for the target node by tracing from the target node through the mapping to the source schema, matching hierarchy by generating a hierarchy match list for the target node, and generating code according to the hierarchy match list. By the method of the invention, code may be generated from a mapping. For example, a graphical representation of data transformations from a source schema to a target schema may be compiled into an XSL style sheet representation of the mapping. The method may further comprise initializing node dependencies memory, including allocating memory for a compiler node, associating the compiler node with the target node, allocating memory for compiler variable classes, and associating compiler variable classes with functoids.

According to another aspect of the invention, a method is provided for compiling a mapping between a source schema having source nodes associated therewith, and a target schema having target nodes associated therewith. The method comprises determining source node dependencies for at least one target node by tracing from at least one target node through the mapping to the source schema, matching hierarchy by generating a hierarchy match list for the at least one target node, and generating code according to the hierarchy match list.

According to yet another aspect of the invention, a system is provided for generating code representing a mapping between a source schema and a target schema, wherein the mapping comprises data transformations from the source schema to the target schema, the source schema comprises a source tree having a source node and the target schema comprises a target tree having a target node. The system comprises means for determining source node dependencies for the target node by tracing from the target node through the mapping to the source schema, means for matching hierarchy by generating a hierarchy match list for the target node, and means for generating code according to the hierarchy match list.

According to yet another aspect of the invention, a computer-readable medium is provided, having computer-executable instructions for generating code representing a mapping between a source schema and a target schema, the mapping comprising data transformations from the source schema to the target schema. The source schema comprises a source tree having a source node and the target schema comprises a target tree having a target node. The computer-readable medium further comprises computer-executable instructions for determining source node dependencies for the target node by tracing from the target node through the mapping to the source schema, matching hierarchy by generating a hierarchy match list for the target node, and generating code according to the hierarchy match list.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of the invention and the attached drawings in which.

DETAILED DESCRIPTION OF THE INVENTION

Figure 1:
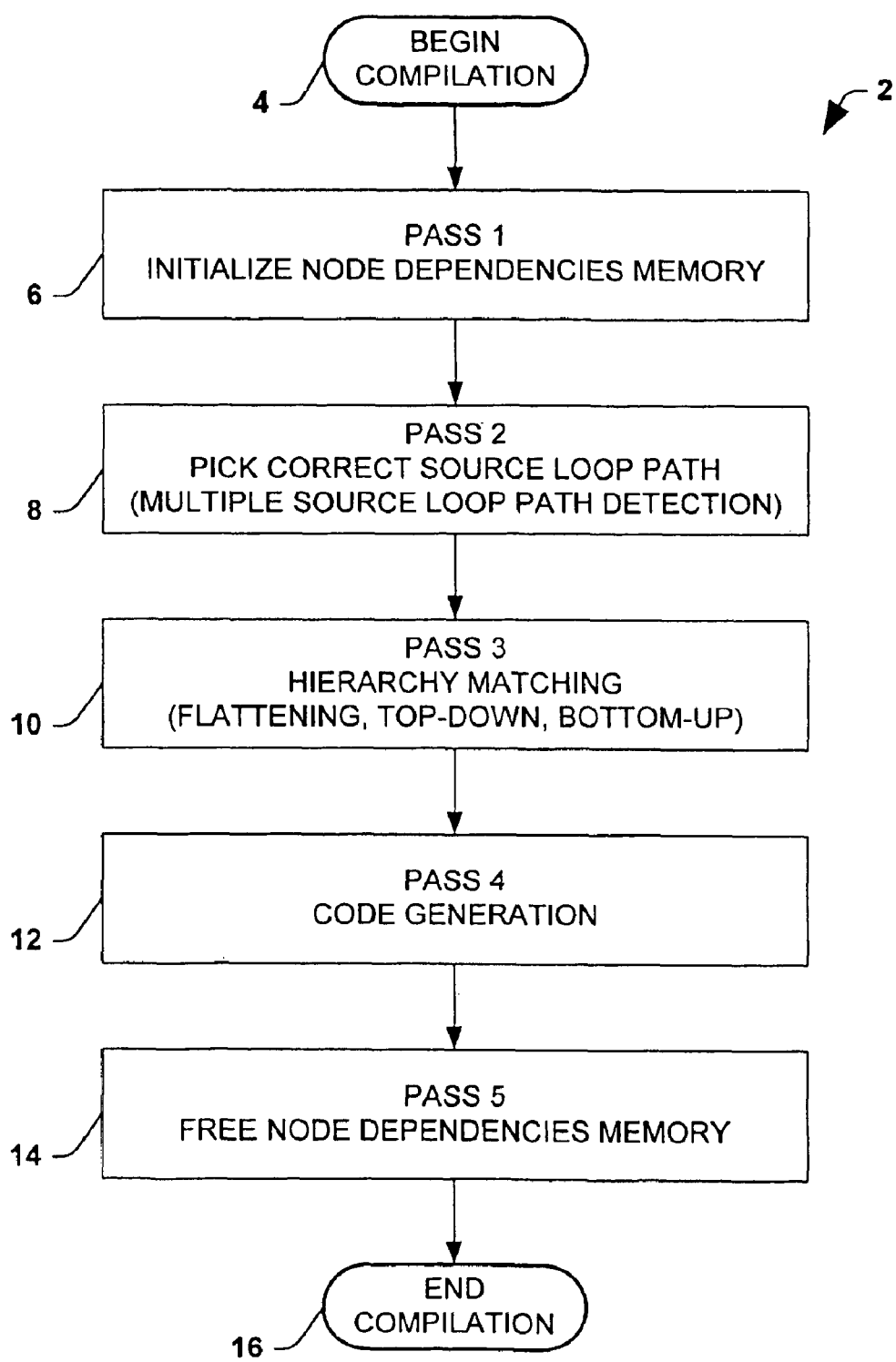
FIG. 1 is a flow diagram illustrating a method of generating code representing a mapping between a source schema and a target schema in accordance with the present invention.

The following is a detailed description of the present invention made in conjunction with the attached figures, wherein like reference numeral will refer to like elements throughout. According to one aspect of the invention, a method and system are provided for compiling a mapping between two documents or schemas, which generates a coded mapping which may be executed in a computer system. The invention further contemplates a computer-readable storage medium having computer-executable instructions for compiling a document or schema mapping. The invention will be described hereinafter with respect to an exemplary implementation in which XML documents and extensible sheetstyle language (XSL) are used to illustrated the various aspects of the invention. However, it will be recognized that the invention comprises implementations for generating code in other languages as well. In addition, the invention contemplates that the source and target may be any type of object, for example, schemas, spreadsheets, databases, documents, and the like. The invention thus advantageously allows an unsophisticated to define relationships between business documents used across business and/or application boundaries, and to generate code capable of handling the information transfers therebetween, without having extensive knowledge of computer programming languages.

Referring now to the drawings, FIG. 1 illustrates illustrating a multi-pass method 2 of generating code representing a mapping between a source schema and a target schema in accordance with the invention. The compilation begins at step 4 after which node dependencies memory is initialized in pass 1 of the compilation at step 6. Thereafter, path 2 of the compilation is performed at step 8 wherein the correct source loop path is picked. In addition multiple source loop paths are detected at step 8. At step 10, the third pass of the multi-pass compilation 2 proceeds with hierarchy matching, after which code generation is performed in pas 4 a step 12. Finally, node dependencies memory is freed at step 14 before the compilation 2 is completed at step 16.

The multi-pass compilation method 2 of FIG. 1 maybe advantageously used, for example, to generate an XSL style sheet for a visual representation of a map created by a user. In this regard, the user may generate a visual representation or mapping using a graphical mapping definition tool (not shown). The exemplary compilation 2, moreover, uses a multi-pass algorithm to achieve this task. Each pass processes some information for nodes in a target schema tree (not shown) and collects data that is used for subsequent passes. As will be discussed in greater detail hereinafter, a source document schema and a target document schema may comprise a tree structure, wherein nodes in the trees may be organized as records and fields. A record may be, for example, an XDR (XML data reduced) schema element that can contain other records and fields. A field is an XDR schema element or attribute that cannot contain other nodes (e.g., a leaf node).

Figure 2:
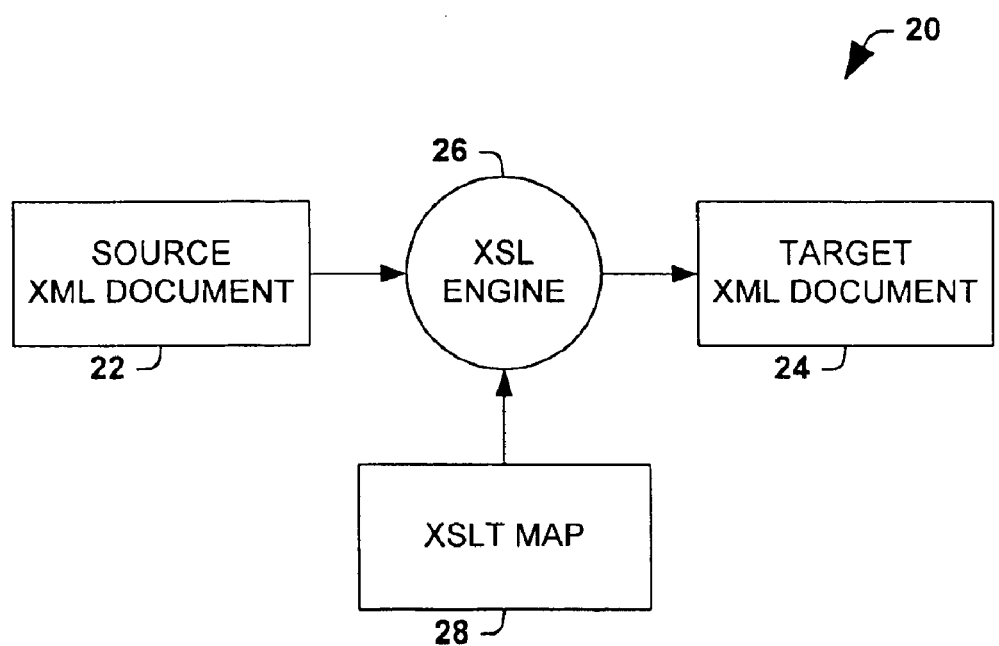
FIG. 2 is a schematic diagram illustrating an XSL engine translating a source XML document into a target XML document according to an XSLT map in accordance with the invention.

Referring now to FIG. 2, an application of the invention is illustrated schematically, wherein a system 20 includes a source XML document 22, a target XML document 24, with an XSL engine 26 therebetween. The XSL engine 26 may comprise, for example, a computer system, which provides data transformations between the source XML document 22 and the target XML document 24 in accordance with an XSLT map 28. In this regard, the method 2 of FIG. 1 may be used to compile a mapping (not shown) into the computer executable instructions or codes, for example, XSLT code (e.g., map 28), which is run by the engine 26 in performing the data transformation.

Figure 3:
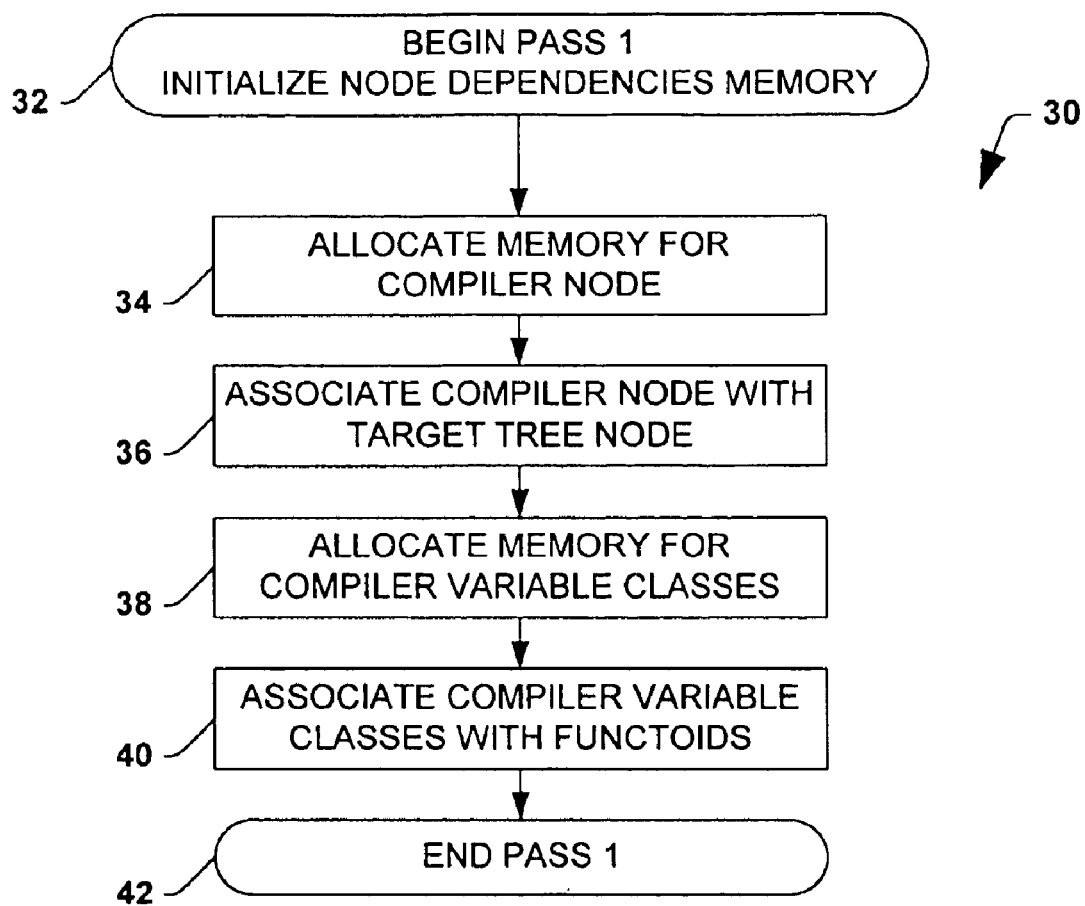
FIG. 3 is a flow diagram illustrating an exemplary first pass of an exemplary compiler method in accordance with the invention.

FIGS. 3–5 illustrate a multi-pass compiler algorithm or method for generating an XSL style sheet for visual representation of a mapping created by a user. Each pass in the illustrated method includes a traversal algorithm defined by a traversal class. All passes except for code generation employ depth-firth tree traversal of the target schema tree. Depth-first tree traversal includes traversing downward on the target tree, executing a pre-execute parent function for all parent nodes through a path all the way to a leaf node. When a leaf node has been reached, an execute-leaf function is called, after which the path is traversed upward back through the tree. On the return path upwards, a post-execute parent function is called for the tree nodes traversed.

The code generation pass uses field-attribute traversal wherein a compiler traverses all child field attributes before field elements and records. Code is written for all field attribute nodes under a parent node prior to generating code for record nodes and field elements. Thus, unlike pure depth-first traversal, in the field-attribute traversal, all fields nodes under a particular record node are processed before the record node itself is processed, in the code generation pass.

Each pass is encapsulated in a separate class. These classes inherit from a single base class that is used by the traversal classes to traverse the destination or target schema tree. The base class defines three pure virtual functions. These include a pre-execute parent function, a post-execute parent function, and an execute leaf function. Each of the derived classes representing the passes implement these three pure virtual functions.

As used hereinafter the term tree node may include a C++ class that encapsulates a graphical user interface representation of a tree node. A compiler node may be a C++ class that is used for the XSL compiler related information. Compiler nodes are associated with the tree nodes in the target schema tree. In addition, the term functoid encapsulates some functionality used for the visual mapping process. A functoid has zero or more inputs and a single output. A functoid manipulates the inputs (depending on the functoid) and provides the result in its output. Using a graphical mapping definition tool (not shown), a user may map data from a source schema tree to a target schema tree, incorporating one or more functoids as required to implement the desired data transformation.

PASS 1—INITIALIZE MEMORY

Referring to FIG. 3, pass 1 (30) of a multi-pass compiler algorithm or method begins at step 32 wherein node dependencies memory is initialized, after which compiler node memory is allocated at step 34. Thus, a portion of compiler memory may be allocated for each node in the target tree. Thereafter, compiler nodes are associated with target tree nodes at step 36, and memory is allocated for compiler variable classes at step 38. Compiler variable classes are then associated with functoids at step 40 after which pass 1 (30) completes at step 42.

PASS 2—SOURCE LOOP PATH SELECTION

Figure 4A:
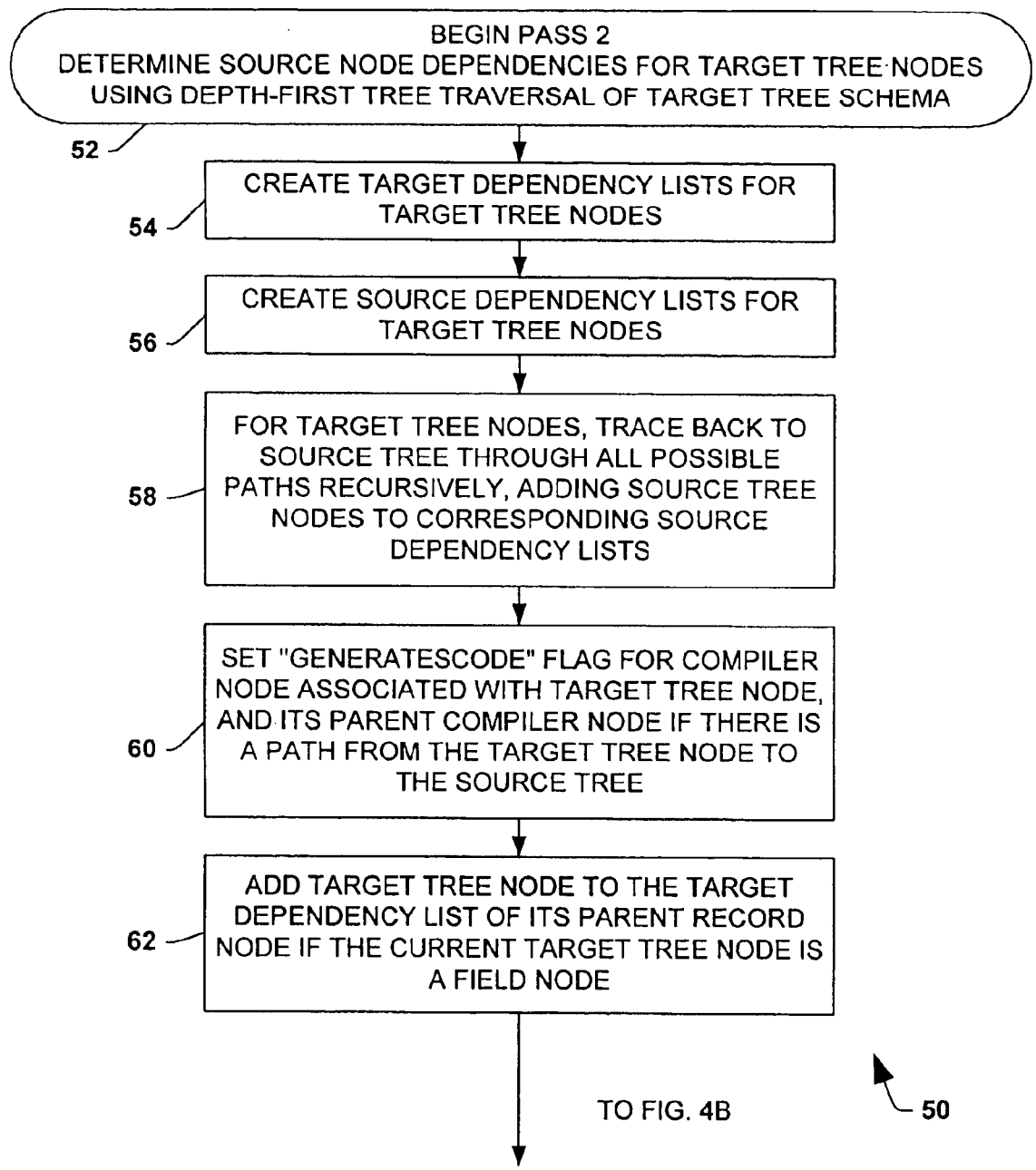
FIG. 4A is a flow diagram illustrating an exemplary second pass of an exemplary compiler method in accordance with the invention.

Referring now to FIG. 4A, pass 2 (50) beings at step 52 wherein source node dependencies for target tree nodes are determined using depth-first tree traversal of the target tree schema. Target dependency lists and source dependency lists (not shown) are created for the nodes in the target tree at steps 54 and 56, respectively. For target tree nodes, the compiler then traces back to the source tree through all possible paths recursively, adding source tree nodes to the corresponding source dependency lists at step 58. A "GENERATESCODE" flag is then set for the compiler node associated with the target tree node, and its parent compiler node if there is a path from the target tree node to the source tree at step 60. If set, this flag may indicate to the compiler in later passes that the node needs to have code generated for it. It will be appreciated that if a child node generates code, so will a parent node associated therewith, and hence the "GENERATESCODE" flag is set therefor as well. Thereafter at step 62, the target tree node is added to the target dependency list of its parent record node if the current target tree node is a field node. The target dependency list therefore indicates which child nodes of a particular target parent node will generate code.

Figure 4B:
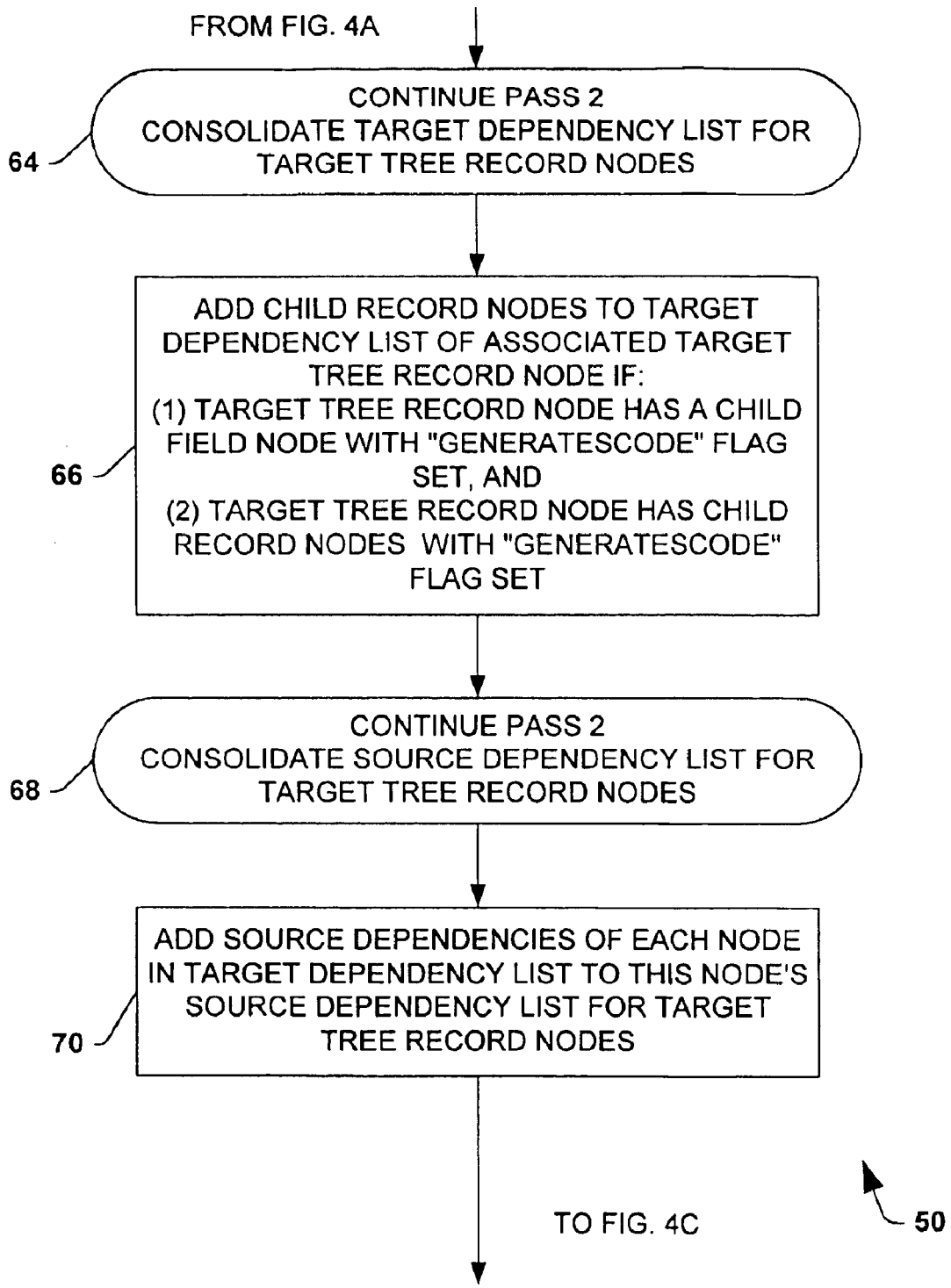
FIG. 4B is a flow diagram further illustrating the second pass of the method of FIG. 4A.

Referring also to FIG. 4B, compiler pass 2 (50) continues at step 64 wherein the target dependency lists are consolidated for the target tree record nodes. At step 66, child record nodes are added to the target dependency lists of associated target tree record nodes if the target tree record node has a child field node with "GENERATESCODE" flag set and the target tree record node has a child record node with "GENERATESCODE" flag set. Pass 2 (50) then continues at step 68 wherein the source dependency lists for the target tree record nodes are consolidated. This includes adding source dependencies of each node in the target dependency list to the current node source dependency list for target tree record nodes at step 70.

Figure 4C:
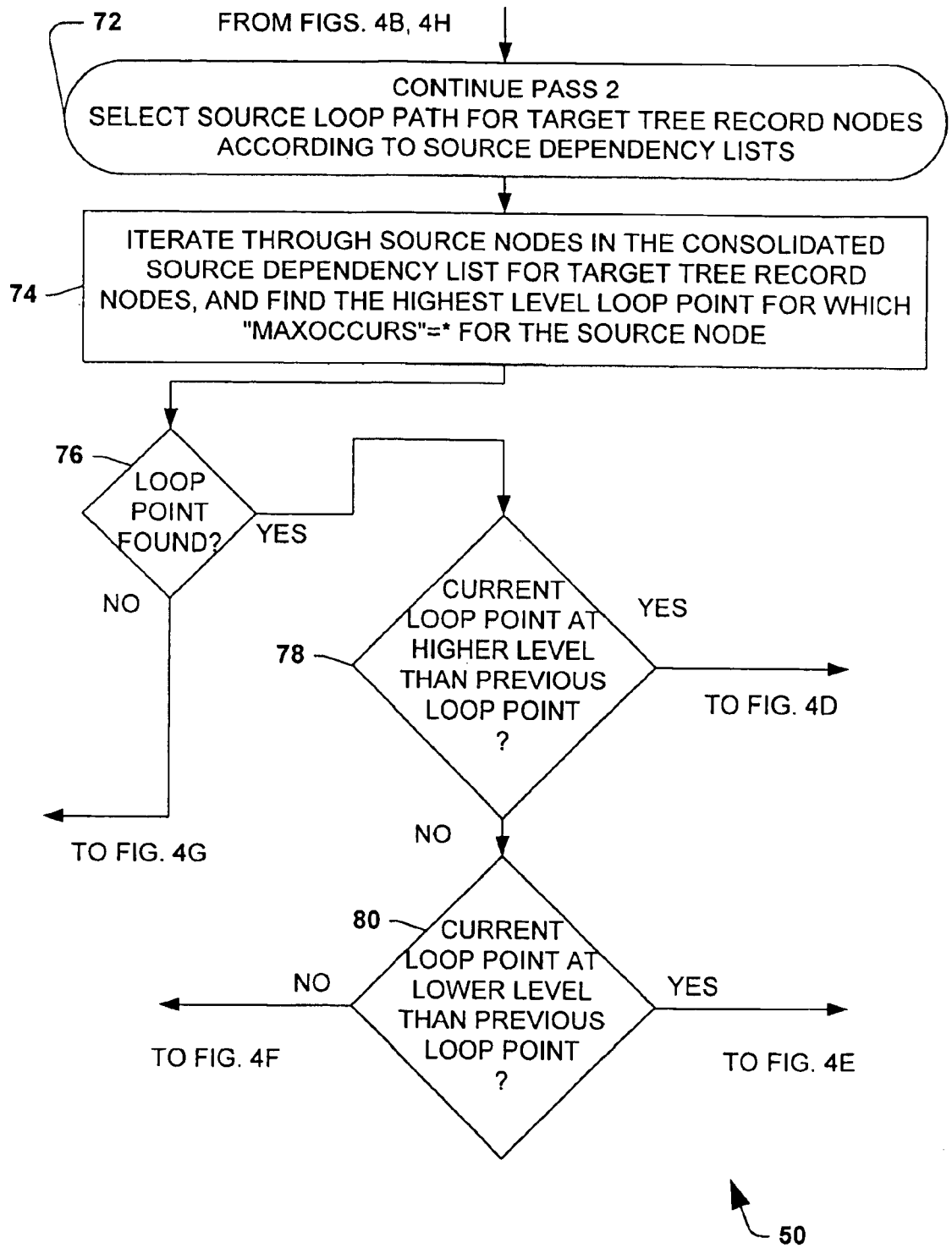
FIG. 4C is a flow diagram further illustrating the second pass of the method of FIGS. 4A and 4B.

Referring now to FIG. 4C, pass 2 (50) further includes selecting source loop paths for target tree record nodes according to source dependency lists at step 72. The purpose of this selection is to determine which of the source nodes which create a dependency on a target node, defines the source path for which code will later be generated. This comprises iterating through the source nodes in the consolidated source dependency list for target tree record nodes, and finding the highest level loop point for which maxoccurs=* for the source node at step 74. The attribute maxoccurs may be used to indicate the maximum number of times that a particular source node can appear in a document. The values for maxoccurs are "1" and "*", where a value of 1 indicates that only one occurrence is possible and a value of * indicates that more than one occurrence of a node is possible. In similar fashion, a minoccurs attribute may be provided for each node, wherein a value of "0" means the node might not appear in a document, and a value of "1" indicates that the node must occur in the document.

The source loop path node may be used in a subsequent code generation pass (e.g., pass 4 (250) as illustrated in FIGS. 9A–9D and described in greater detail infra) as the point around which the generated code will iterate or loop. As an example, where the generated code is XSL, the source loop path node may be used in generating <xsl:for-each >code.

As used herein, the term highest level refers to the hierarchy of the tree structure of the source and/or target schema, wherein a node level refers to the number of hierarchy levels separating a particular node from its root node. For example, a node in a tree directly connected with its root node is at level one, wherein a node having connection to a root node through three intervening nodes is at level 4, etc.

A loop point or source loop path node is a source tree node for which maxoccurs=*. If no loop point is found at step 76, the method continues as illustrated and described hereinafter with respect to FIG. 4G. If a loop point is found a step 76, decision step 78 determines whether the current loop point is at a higher level than a previous loop point. In this regard, in the iteration through the source nodes listed in the consolidated source dependency list for a target tree node, the compiler may identify a loop point, and later identify another. Thus, decision step 78 arbitrates between a previous and current loop point thus identified, to determine which one is the appropriate loop point to be stored in preparation for a subsequent code generation pass (e.g., pass 4 (250) of FIGS. 9A–9D). For example, the desired loop point is the one that is at the highest level.

Figure 4D:
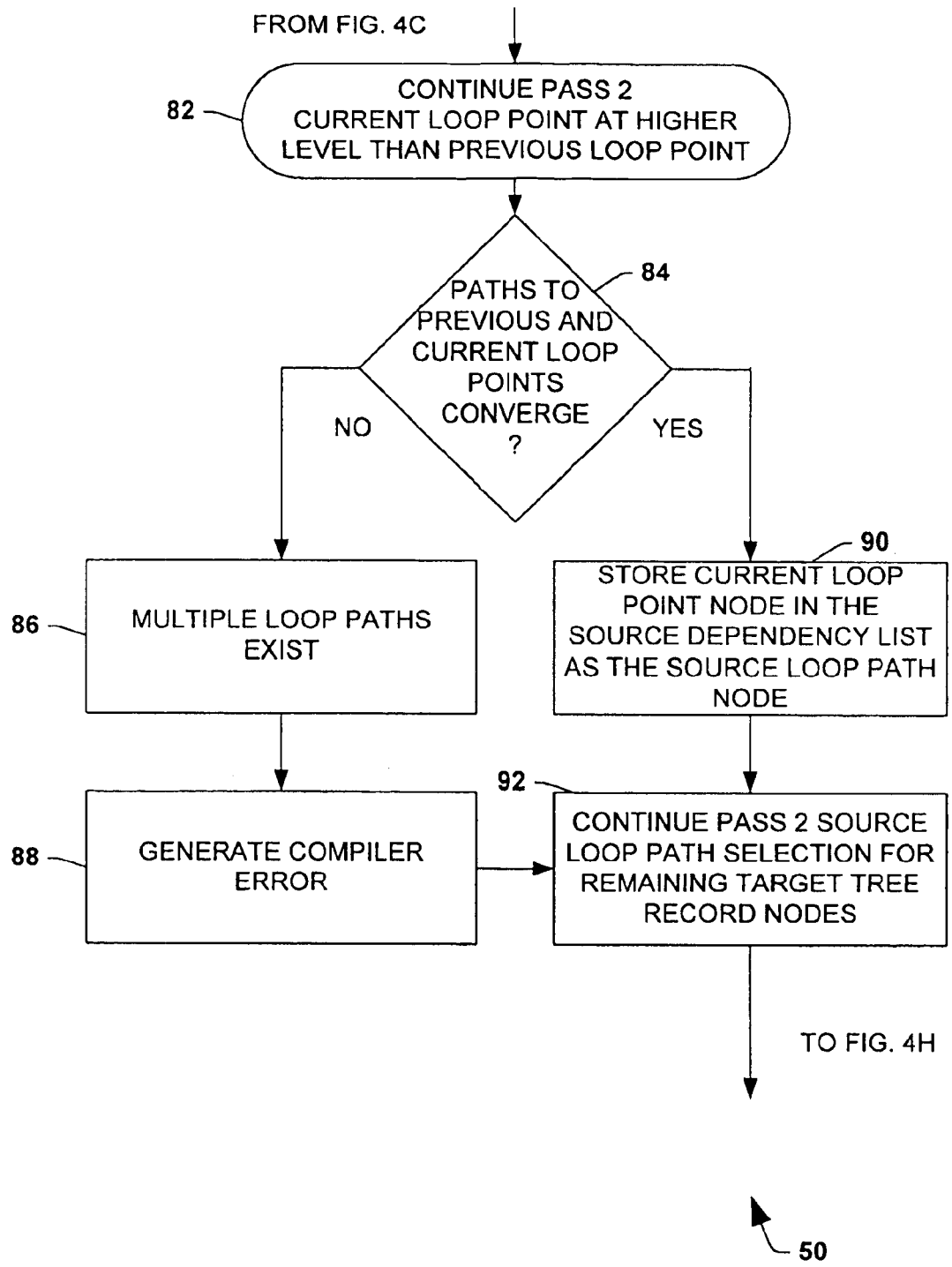
FIG. 4D is a flow diagram further illustrating the second pass of the method of FIGS. 4A, 4B, and 4C.

If the current loop point is at a higher level than a previous loop point at step 78, the method proceeds as illustrated and described with respect to FIG. 4D. If not, decision step 80 determines whether the current loop point is at a lower level than the previously found loop point. If this is true, the method proceeds via FIG. 4E. If not, (the current loop point and the previous loop point are at the same level), the compiler method proceeds as shown and described with respect to FIG. 4F.

Referring now to FIG. 4D, pass 2 (50) precedes at step 82 for the case where the current loop point is at a higher level than the previous loop point. Decision step 84 determines whether the paths to the previous and current loop points converge. If not, the compiler method determines whether multi-loop paths exist at step 86, after which a compiler error may be generated at step 88. However, if the paths to the previous and current loop points do not converge, the current node is stored in the source dependency list as the source loop path node at step 90. Pass 2 (50) then continues at step 92 wherein loop path selection is performed for the remaining target tree record nodes.

Figure 4E:
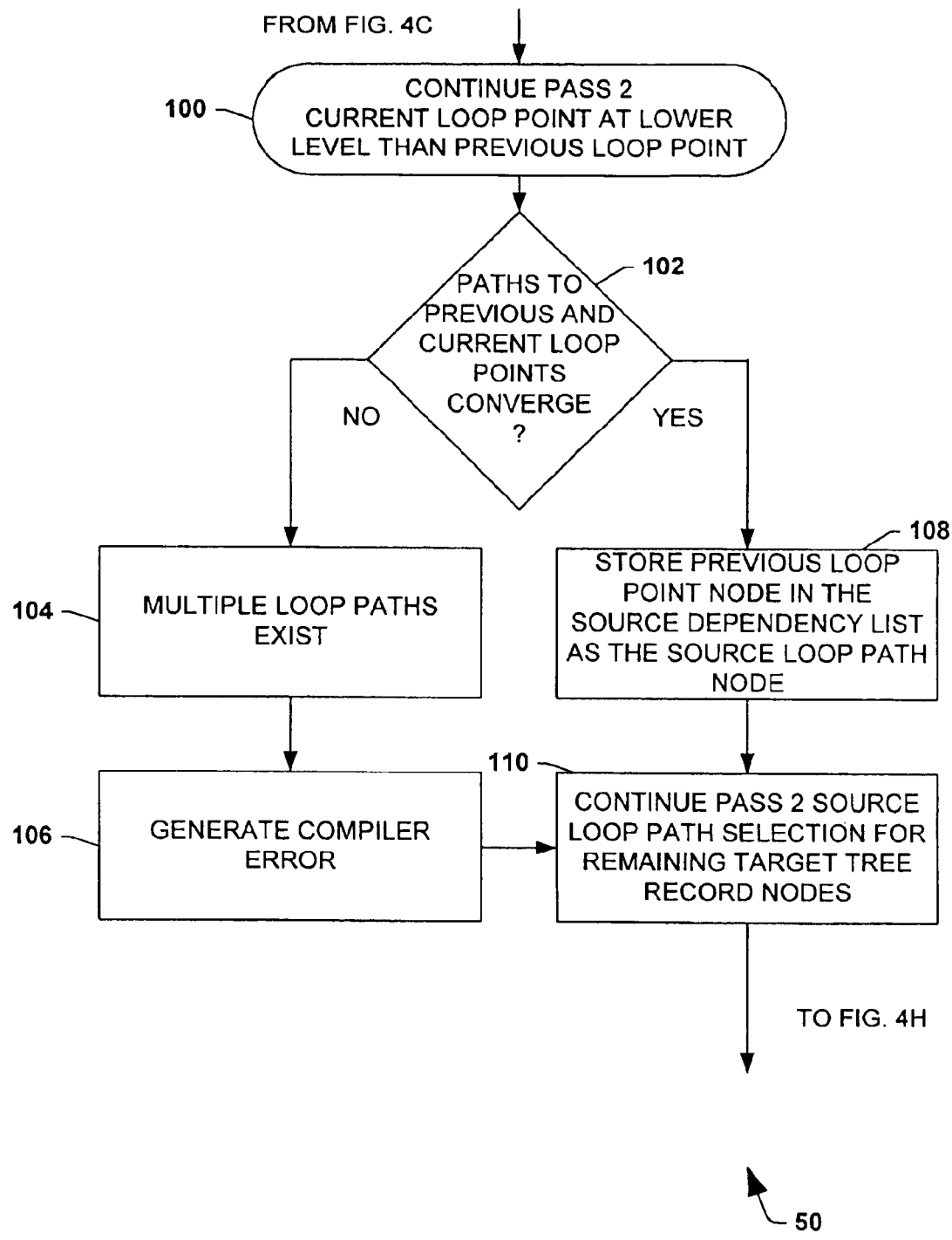
FIG. 4E is a flow diagram further illustrating the second pass of the method of FIGS. 4A–4D.

Referring to FIG. 4E, pass 2 (50) is illustrated for the case where current loop point is a lower level than the previous loop point beginning at step 100. Decision step 102 determines whether paths to the previous and current loop points converge. If not, multiple loop paths exist and a compiler error may be generated via steps 104 and 106, respectively. If the paths converge, the previous node is stored in the source dependency list as the source loop path node for the current target node at step 108 after which pass 2 (50) continues at step 110 to perform source loop path selection for the remaining target tree record nodes.

Figure 4F:
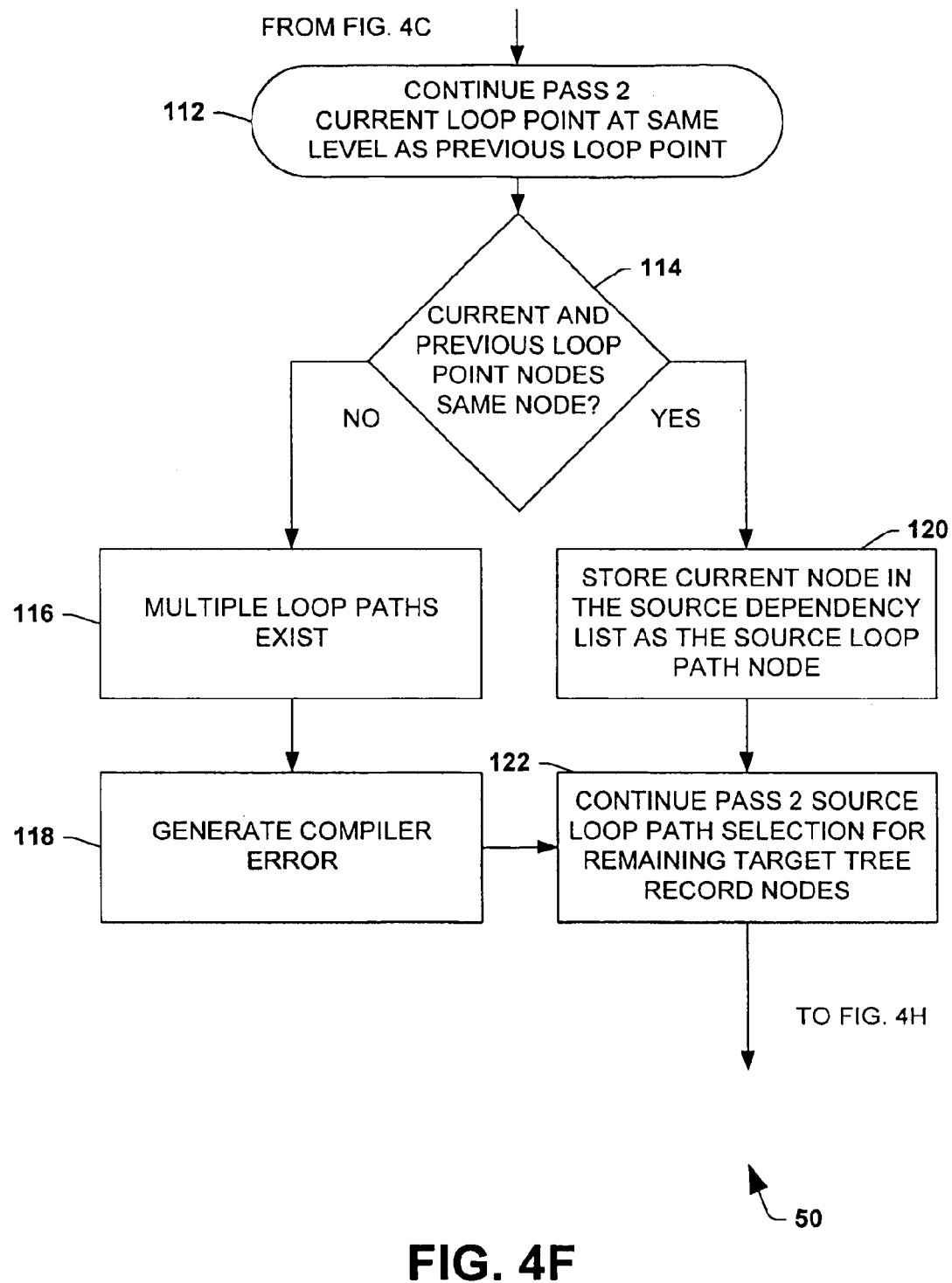
FIG. 4F is a flow diagram further illustrating the second pass of the method of FIGS. 4A–4E.

Referring also to FIG. 4F, pass 2 (50) is illustrated for the case where the current loop point and the previous loop point are at the same level beginning at step 112. If this is the case, decision step 114 determines whether the current and previous loop point nodes are the same node. If not, multiple loop paths exist and a compiler error may be generated at steps 116 and 118, respectively. If a current and previous loop point nodes are indeed the same, this node is stored in the source dependency list for the current target node as the source loop path node at step 120. Thereafter pass 2 (50) continues at step 122 for any remaining target tree record nodes.

Figure 4G:
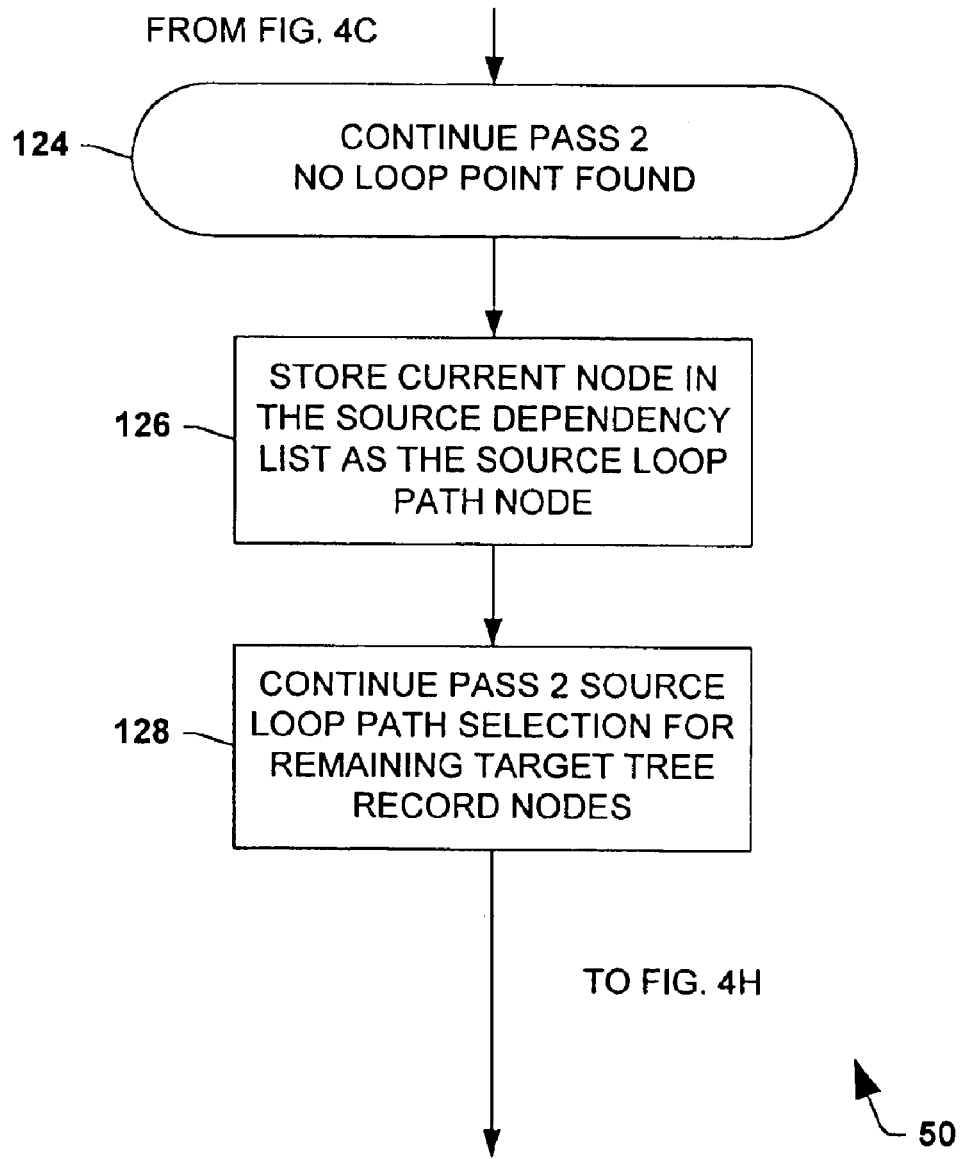
FIG. 4G is a flow diagram further illustrating the second pass of the method of FIGS. 4A–4F.

As discussed above, if no loop point node is found at step 76 of FIG. 4C for a particular target node, pass 2 (50) continues as illustrated in FIG. 4G at step 124. The current node is then stored in the source dependency list as the source loop path node at step 126 before the source loop path selection of pass 2 (50) is continued at step 128 for remaining target tree record nodes.

Figure 4H:
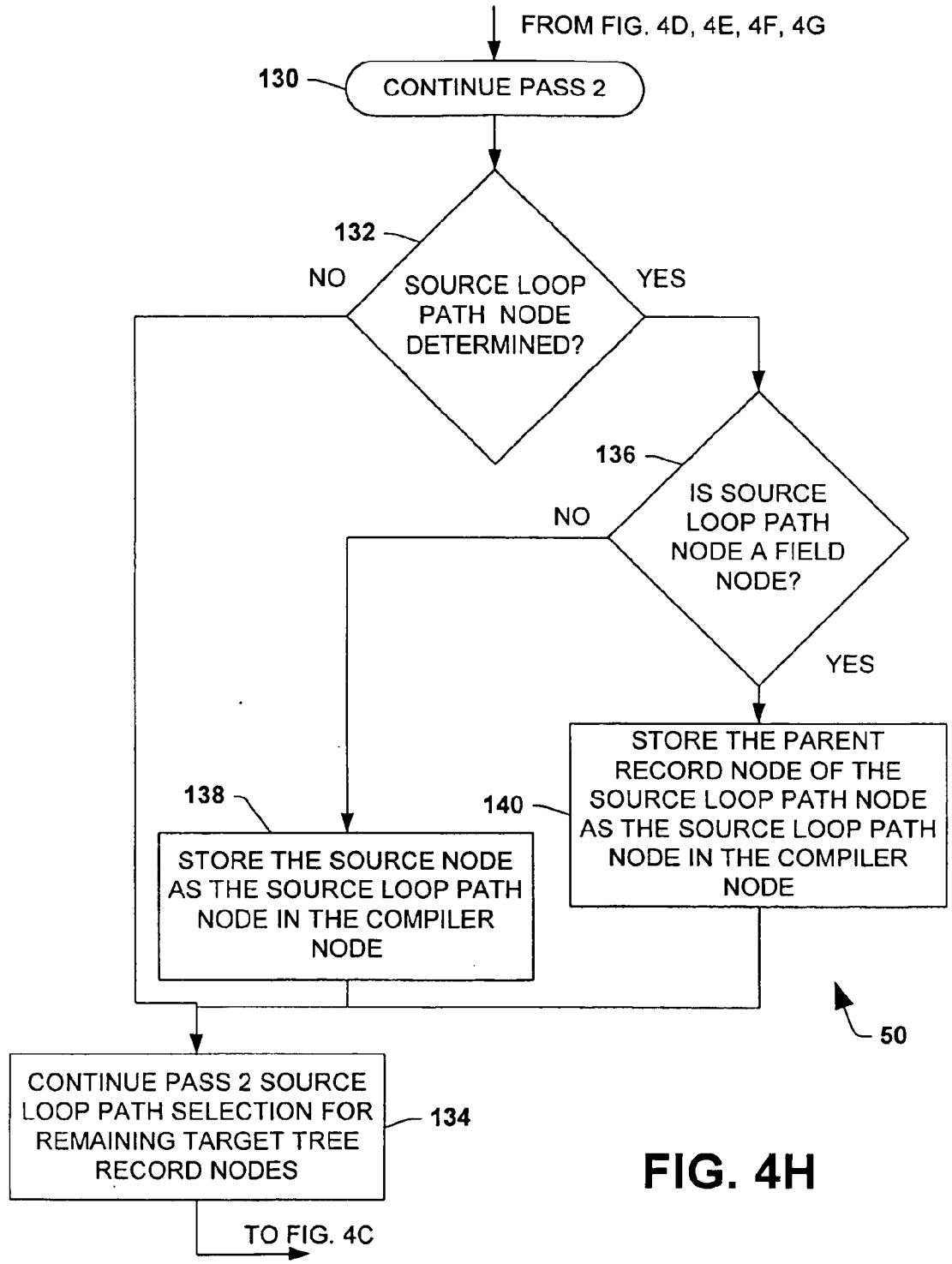
FIG. 4H is a flow diagram further illustrating the second pass of the method of FIGS. 4A–4G.

Referring to FIG. 4H, pass 2 (50) continues at step 130 after which decision step 132 determines whether the source loop path node has been determined. If not, pass 2 (50) source loop path selection is continued for remaining target tree record nodes at step 132. However, once the source loop path node has been determined decision step 136 determines if the source loop path node is a field node. If not, the compiler stores the source loop path node in the compiler node associated with the current target node at step 138. If, however, the source loop path node is a field node, the parent record node of the source loop path node is stored as the source loop path node in the compiler node at step 140 prior to continuation of pass 2 (50) at step 134. Pass 2 (50) continues in this fashion to determine source node dependencies for the target tree nodes using depth-first tree traversal of the target tree schema in the manner described in FIGS. 4A–4H.

PASS 3—HIERARCHY MATCHING

Having determined a source loop point (and hence a source loop path) for the target tree nodes in pass 2 (50), FIGS. 5A–5E illustrate an exemplary pass 3 (150) which may be used for hierarchy matching using depth-first tree traversal of the target tree schema. Pass 3 (150) may be employed as part of a multi-step or multi-pass method of generating code representing a mapping between schemas, which may represent XML documents. The pass 3 hierarchy matching 150 begins at step 152, where after decision step 154 determines whether the current target node has a source loop path node. If not, no hierarchy matching is done and the next target node is processed at step 156 and 154. If the current target node has a source loop path node at decision step 154, a hierarchy match list is created for the target node at step 158 after which the compiler determines a consolidated compiler link option using links on target node dependency at step 160.

A consolidated compiler link option is a property associated with a mapping link to a target tree node, which may be defined by a user in creating the mapping. In the exemplary compiler method illustrated herein, the possible compiler link options may include, for example, flattening, top-down, and/or bottom-up. A compiler link option may be associated with a link from a mapping to a particular target tree node via the mapping definition created by a user. Decision step 162 checks for conflicting compiler links. If such compiler link conflicts exist, step 167 may generate a compiler error.

Figure 5A:
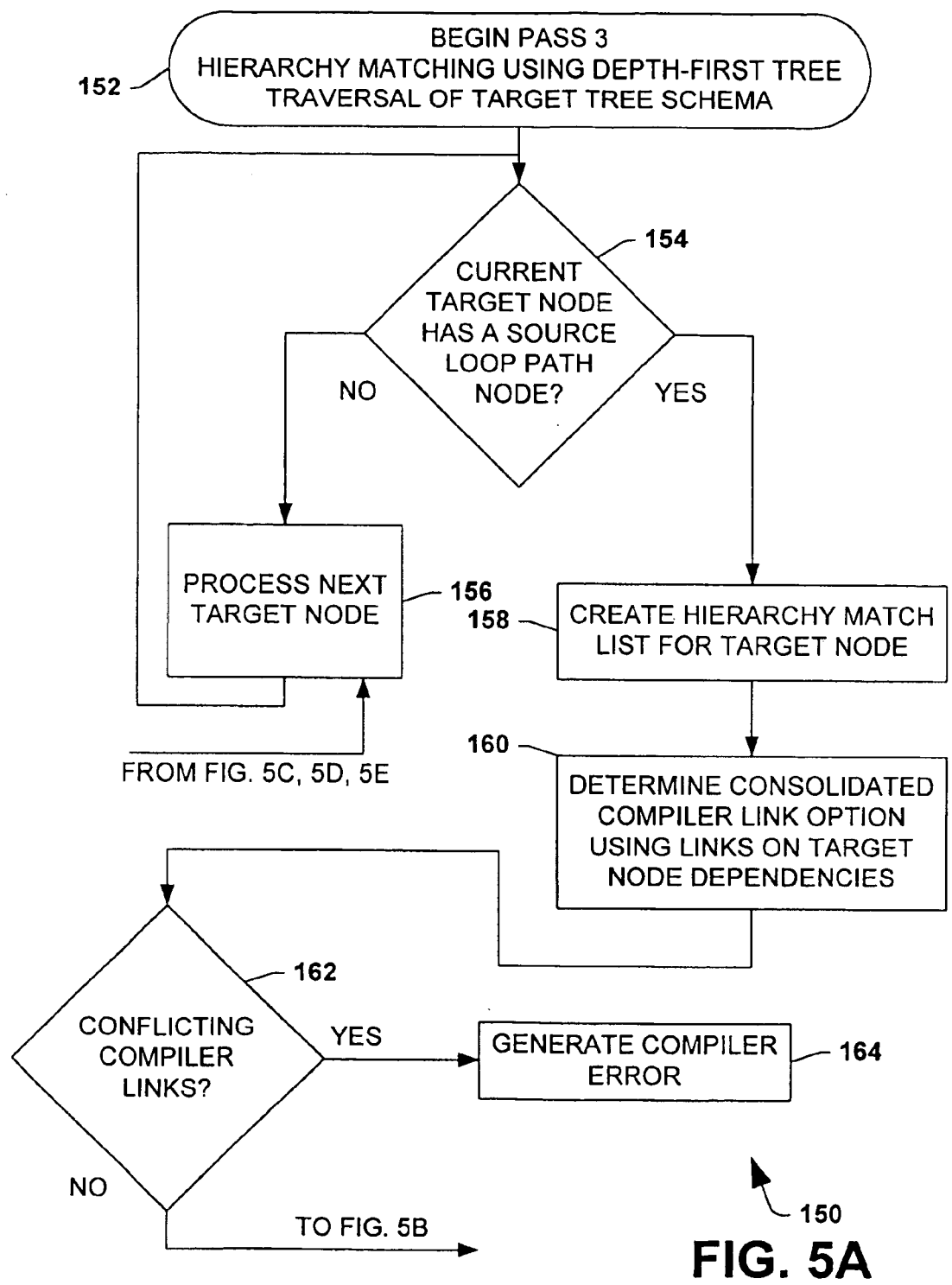
FIG. 5A is a flow diagram illustrating an exemplary third pass of an exemplary compiler method in accordance with the invention.
Figure 5B:
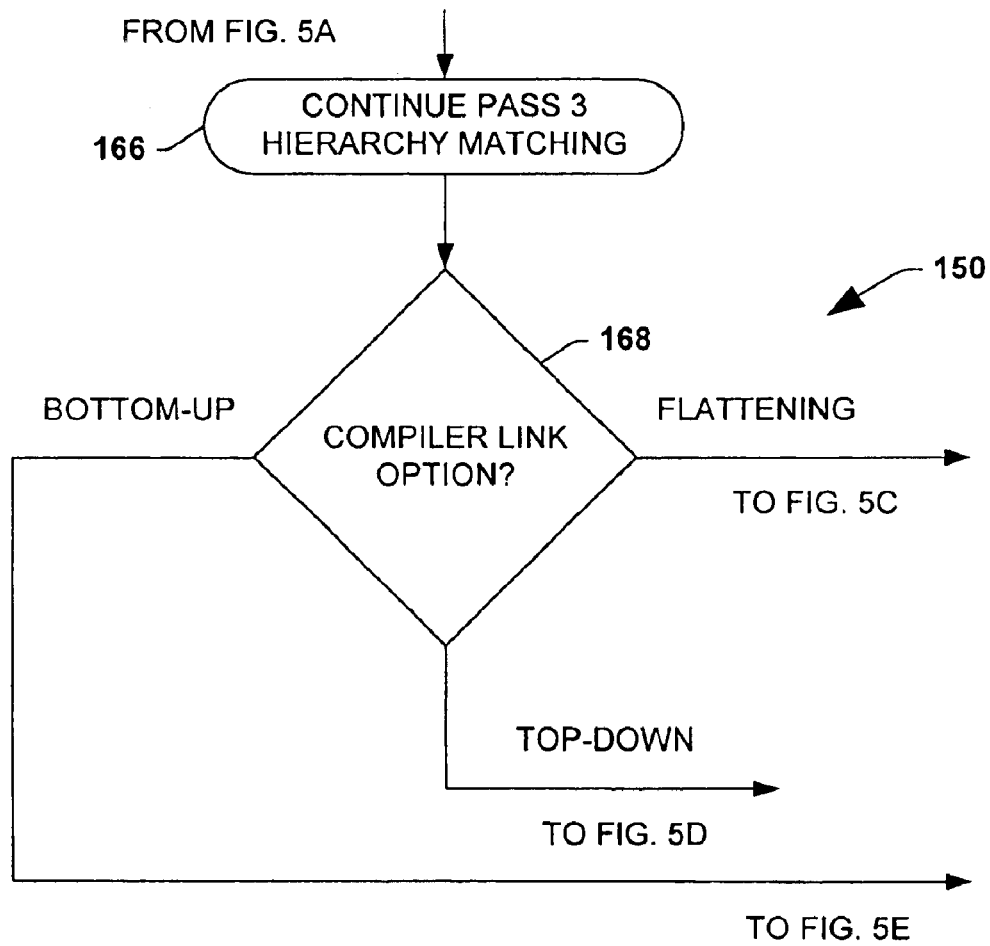
FIG. 5B is a flow diagram further illustrating the third pass of the method of FIG. 5A.
Figure 5C:
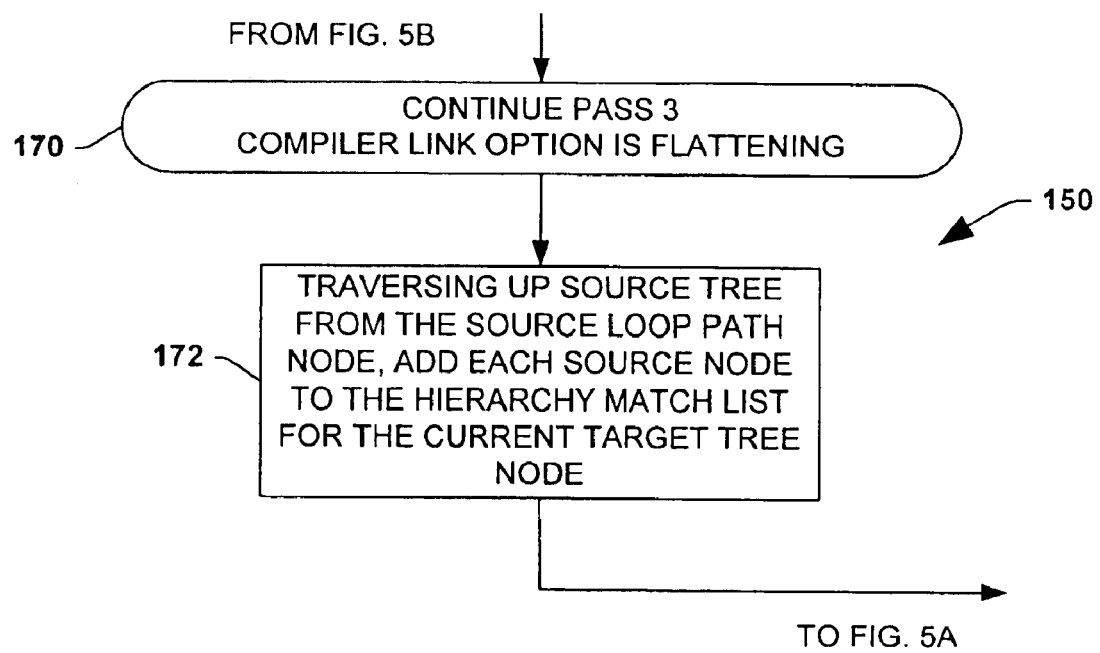
FIG. 5C is a flow diagram further illustrating the third pass of the method of FIGS. 5A–5B.

Referring now to FIG. 5B, hierarchy matching of pass 3 (150) continues at step 166 after which decision step 168 determines whether the compiler link option is flattening, top-down, or bottom-up. Referring also to FIG. 5C, if the compiler link option is flattening, pass 3 (150) continues at step 170. Thereafter, the compiler traverses up the source tree from the source loop path node, adding each source node encountered to the hierarchy match list for the current target tree node at step 172, before processing the next target tree node beginning with step 156 of FIG. 5A.

Figure 5D:
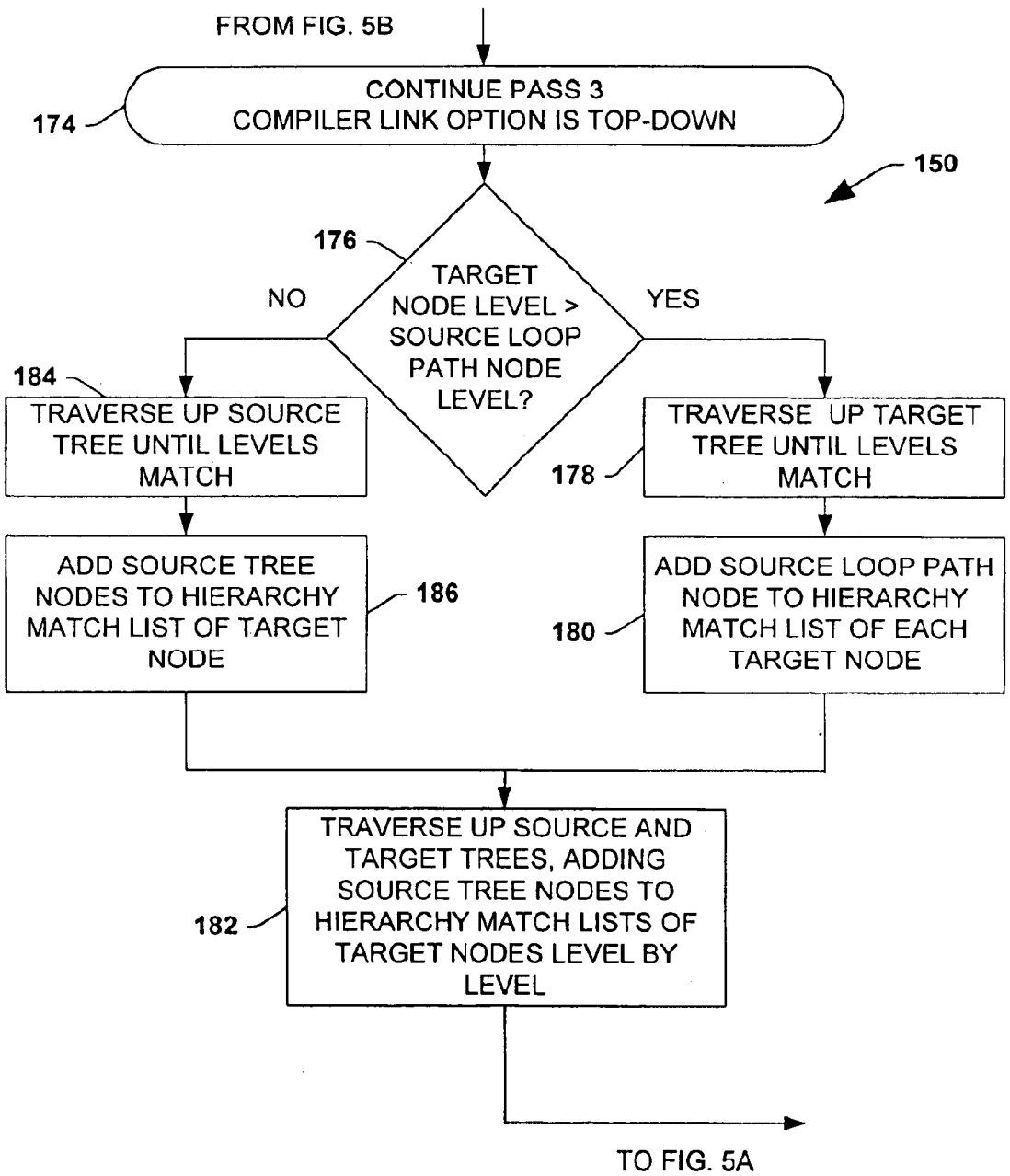
FIG. 5DC is a flow diagram further illustrating the third pass of the method of FIGS. 5A–5C.

Referring also to FIG. 5D, if the compiler link option is top-down, hierarchy matching pass 3 (150) continues at step 174 with decision step 176 determining whether the target node level is greater than the source loop path node level. If so, the compiler traverses up the target tree until the levels match at step 178, and the source loop path node is added to the hierarchy match list of each target node encountered in traversing up the target tree at step 180. Thereafter, the compiler traverses up the source and target trees, adding source tree nodes to the hierarchy match lists of the target tree nodes level by level at step 182.

If the target node level is not greater than the source loop path node level at decision step 176, the compiler traverses up the source tree until the levels match at step 184 adding the source tree nodes encountered to the hierarchy match list of the target tree node at step 186. Thereafter at step 182, the compiler traverses up the source and target trees, adding source tree nodes to the hierarchy match lists of target tree nodes level by level.

Figure 5E:
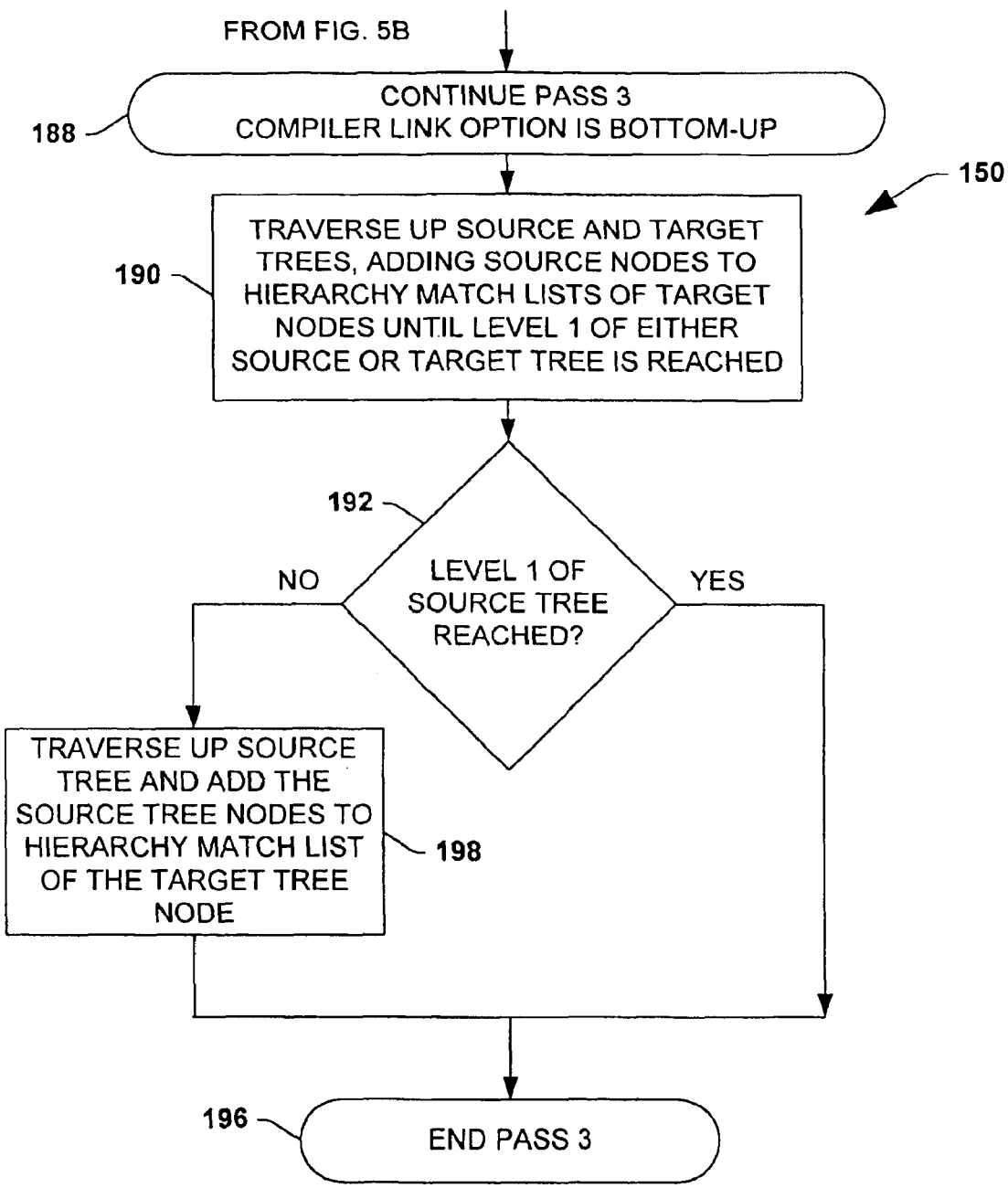
FIG. 5E is a flow diagram further illustrating the third pass of the method of FIGS. 5A–5D.

Referring now to FIG. 5E, the pass 3 hierarchy matching 150 continues at step 188 for the case where the compiler link option is bottom-up. In this case, the compiler traverses up the source and target trees, adding source nodes to the hierarchy match lists of the target nodes until level 1 of either the source or the target tree is reach at step 190. Decision step 192 then determines whether level 1 of the source tree has been reached. If so, the compiler pass 3 (150) ends at step 196. If level 1 of the source tree has not been reached at step 192, the compiler will traverse up the source tree and add the source tree nodes encountered to the hierarchy match list of the target tree node at step 198 before pass 3 (150) ends at step 196.

Figure 6A:
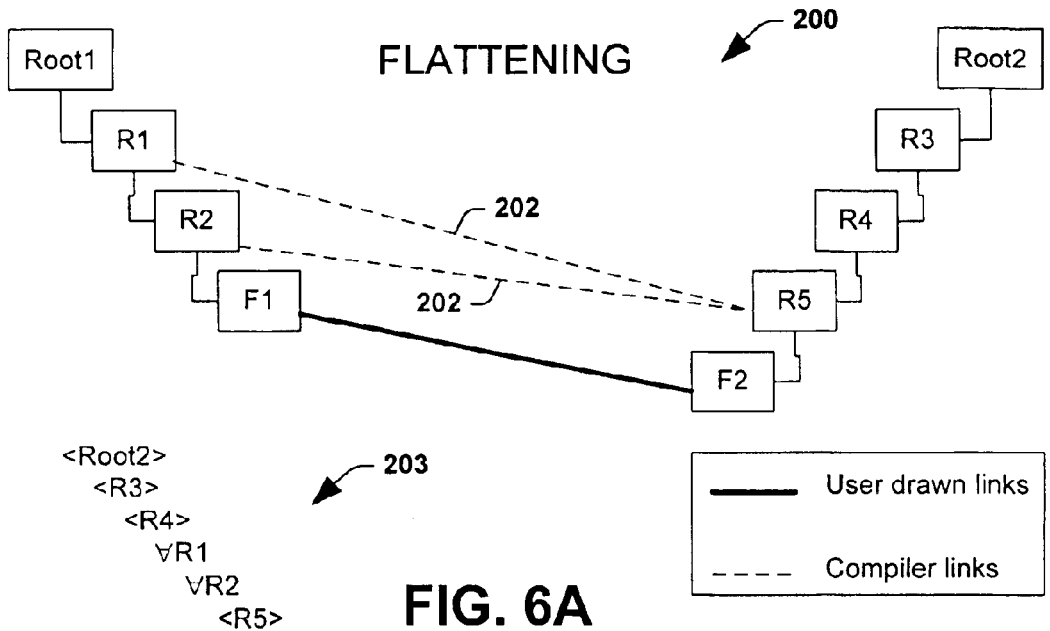
FIG. 6A is a schematic diagram illustrating an exemplary hierarchy matching where a compiler link option is flattening in accordance with an aspect of the invention.

Referring now to FIG. 6A, an example of the flattening hierarchy matching methodology of FIG. 5C is illustrated with respect to an exemplary mapping 200. The mapping 200 is illustrated for a source tree comprising root node Root 1, record nodes R1 and R2, and a field node F1, and a target tree comprising root node Root 2, record nodes R3 R4 and R5, and a field node F2. The user defined mapping in this example includes a user drawn link between field nodes F1 and F2, wherein the mapping may be created, for example, via a graphical mapping definition tool (not shown). Assuming the source loop path node for target node R5 is R2, the compiler climbs up the source tree from the source loop path node R2 adding source nodes R2 and R1 to the hierarchy match list for the current target tree node R5, as illustrated in FIG. 6A by the dashed compiler link lines 202. The resulting hierarchy 203 is illustrated in FIG. 6A, wherein the ∇ symbol indicates a logical for-each operator. As an example, the hierarchy 203 may indicate that for each R1 and for each R2 record in a source document, the code should generate an R5 record in the target document.

Figure 6B:
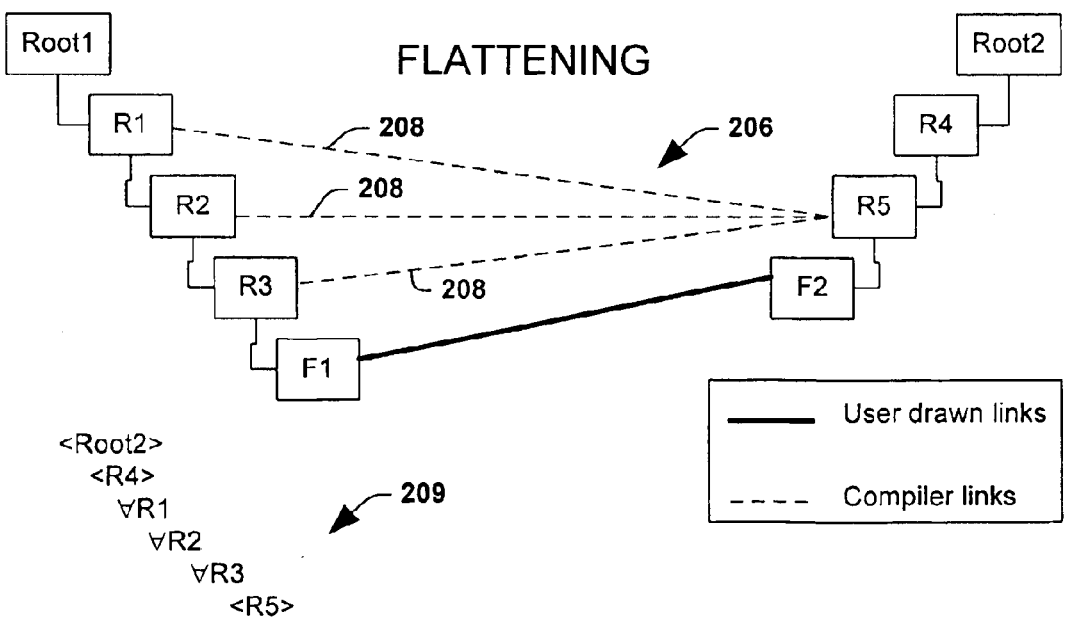
FIG. 6B is a schematic diagram illustrating another hierarchy matching where a compiler link option is flattening in accordance with an aspect of the invention.

Referring also to FIG. 6B, another exemplary mapping 206 is illustrated in which it is assumed that the source loop path node for target node R5 is R3. According to step 172 of the methodology of FIG. 5C, the compiler climbs up the source tree from the source loop path node R3, adding source nodes R3, R2 and R1 to the hierarchy match list for the target node R5. The hierarchy matching in this case results in compiler links 208 illustrated in dashed-line form, with a representative hierarchy 209 illustrated for the flattening hierarchy matching of the mapping 206.

Figure 7A:
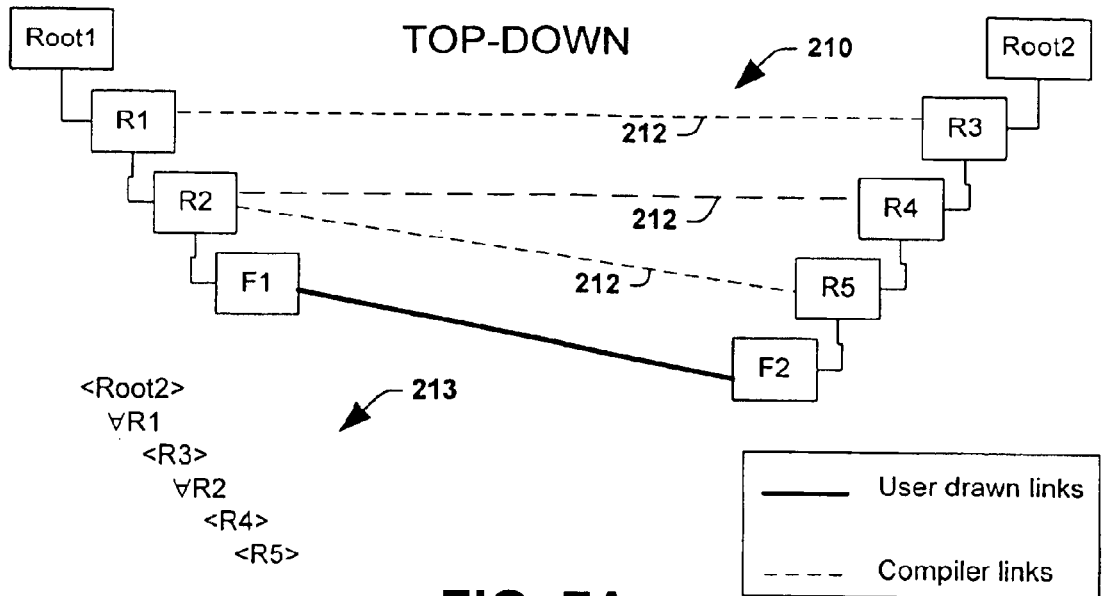
FIG. 7A is a schematic diagram illustrating an exemplary hierarchy matching where a compiler link option is top-down in accordance with an aspect of the invention.

Referring now to FIGS. 5D and 7A, an exemplary mapping 210 illustrates an exemplary hierarchy matching wherein the compiler link option is top-down in accordance with the invention. In this example, it will be noted that source tree node Root1 is at level 0, node R1 is at level 1, node R2 is at level 2, and field node F1 is at level 3. Similarly, in the source tree, root node R2 is at level 0, node R3 is at level 1, node R4 is at level 2, node R5 is at level 3, and field node F2 is at level 4.

Assuming that source node R2 is the source loop path node for target node R5, the compiler in this example would determine at step 176 of FIG. 5D that the target node level (e.g., 3) is greater than the source loop path node level (e.g., 2). Accordingly, the compiler traverses up the target tree until the levels match (e.g., to target node R4 at level 2) per step 178 and adds source loop path node R2 to the hierarchy match list of each target node R5 and R4. Preceding to step 182, the compiler then traverses up the source and target trees, adding source tree node R1 to the hierarchy match list of target tree node R3 as illustrated by compiler link dashed lines 212. The resulting hierarchy 213 for this example is illustrated in FIG. 213 with the ∇ symbol indicating a logical for-each operator.

Figure 7B:
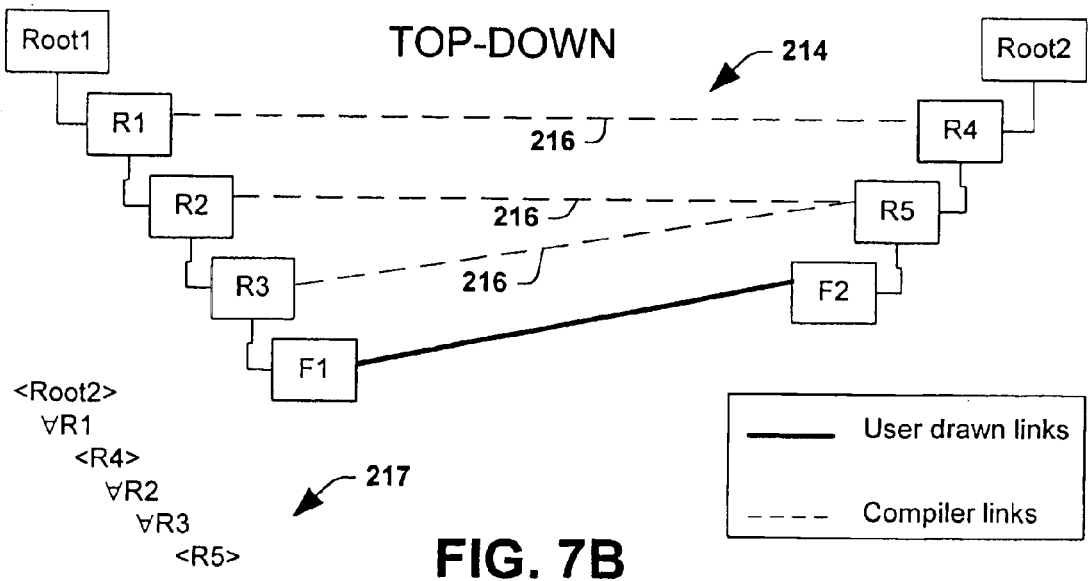
FIG. 7B is a schematic diagram illustrating another hierarchy matching where a compiler link option is top-down in accordance with an aspect of the invention.

In the example mapping 214 of FIG. 7B, assuming that source node R3 is the source loop path node for target node R5, the compiler at step 176 of FIG. 5D determines that the target node level (e.g., 2) is not greater than the source loop path node level (e.g., 3). Accordingly, the compiler traverses up the source tree until the levels match (e.g., source node R2 at level 2) per step 184, adding source tree nodes R3 and R2 to the hierarchy match list of target node R5 per step 186. The compiler then traverses up the source and target trees, adding source tree node R1 to the hierarchy match list of target tree node R4. Compiler links 216 illustrate the top-down hierarchy matching in this example, along with an exemplary hierarchy 217.

Figure 8A:
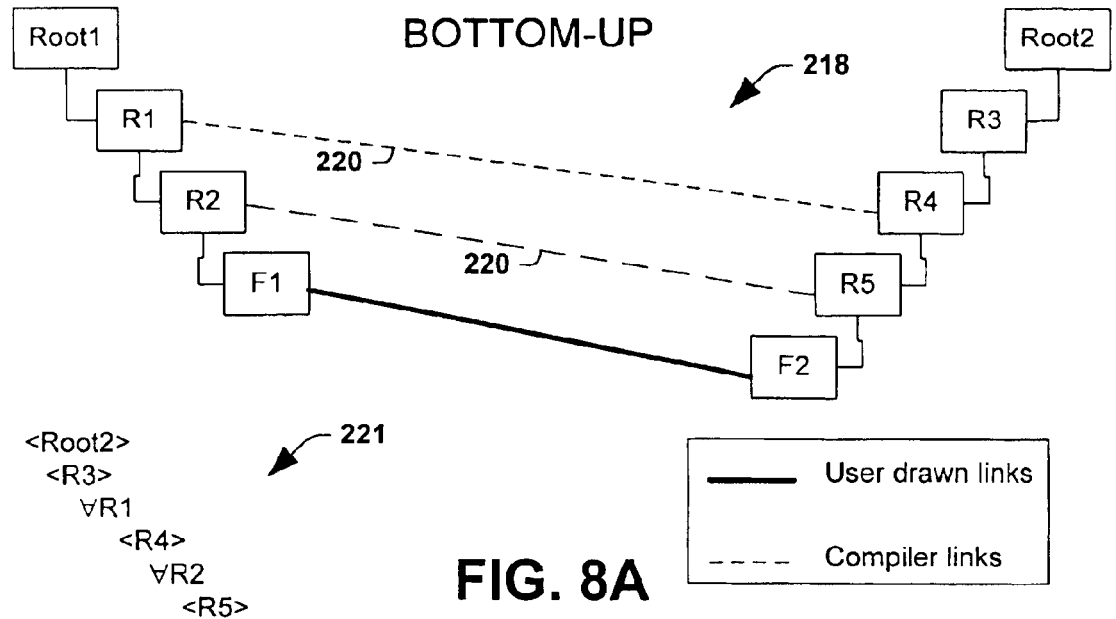
FIG. 8A is a schematic diagram illustrating an exemplary hierarchy matching where a compiler link option is bottom-up in accordance with an aspect of the invention.
Figure 8B:
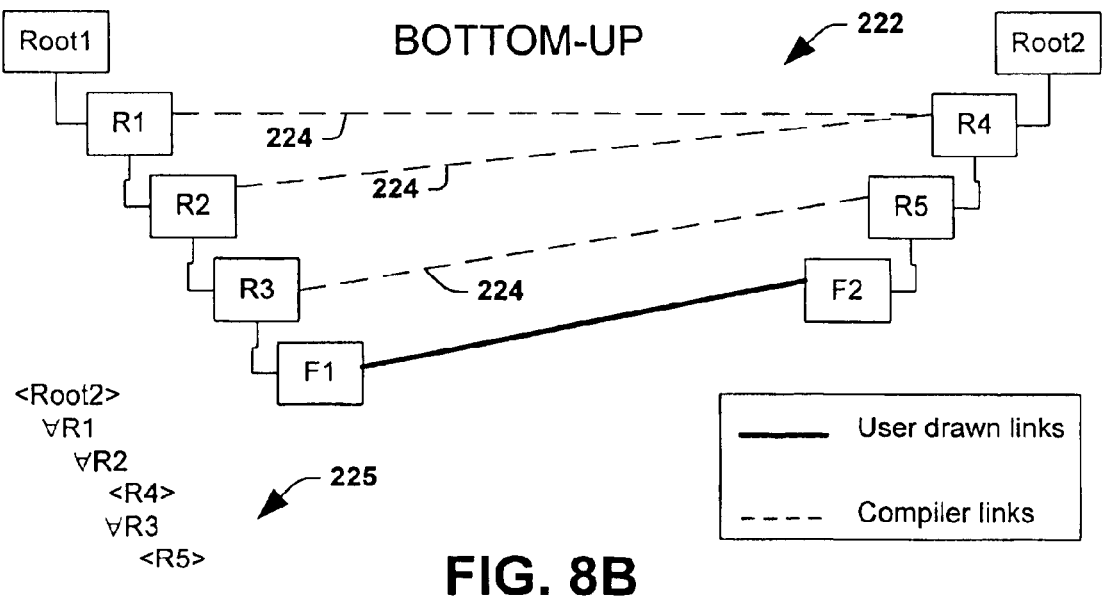
FIG. 8B is a schematic diagram illustrating another hierarchy matching where a compiler link option is bottom-up in accordance with an aspect of the invention.

Examples of bottom-up hierarchy matching are illustrated in FIGS. 8A and 8B. Referring also to FIG. 5E, it is assumed that source node R2 in FIG. 8A is the source loop path node for target node R5. At step 190, the compiler traverses up the source and target trees, adding source nodes to the hierarchy match lists of the target nodes until level 1 of the source tree is reached. In this case, the compiler will add source node R2 to the hierarchy match list of target node R5, and add source node R1 to the hierarchy match list of target node R4. At step 192 it is determined that level 1 of the source tree has been reached (e.g., at node R1). This bottom-up hierarchy matching results in the compiler links 220 illustrated in dashed lines, and the exemplary hierarchy 221 illustrated in FIG. 8A.

Another exemplary hierarchy matching is illustrated in FIG. 8B wherein a mapping 222 includes a source node R3 which is the source loop path node for target node R5. In this case, the compiler traverses up the source and target trees, adding source node R3 to the hierarchy match list of target node R5, and source node R2 to the hierarchy match list of target node R4 according to step 190 of FIG. 5E. Thereafter, decision step 192 determines that level 1 of the source tree has not been reached. Thereafter, the compiler at step 198 traverses up the source tree and adds source tree node R1 to the hierarchy match list of the target tree node R4. This example of bottom-up hierarchy matching results in the compiler links 224 illustrated in dash lines and the exemplary hierarchy 225 in FIG. 8B.

PASS 4—CODE GENERATION

Figure 9A:
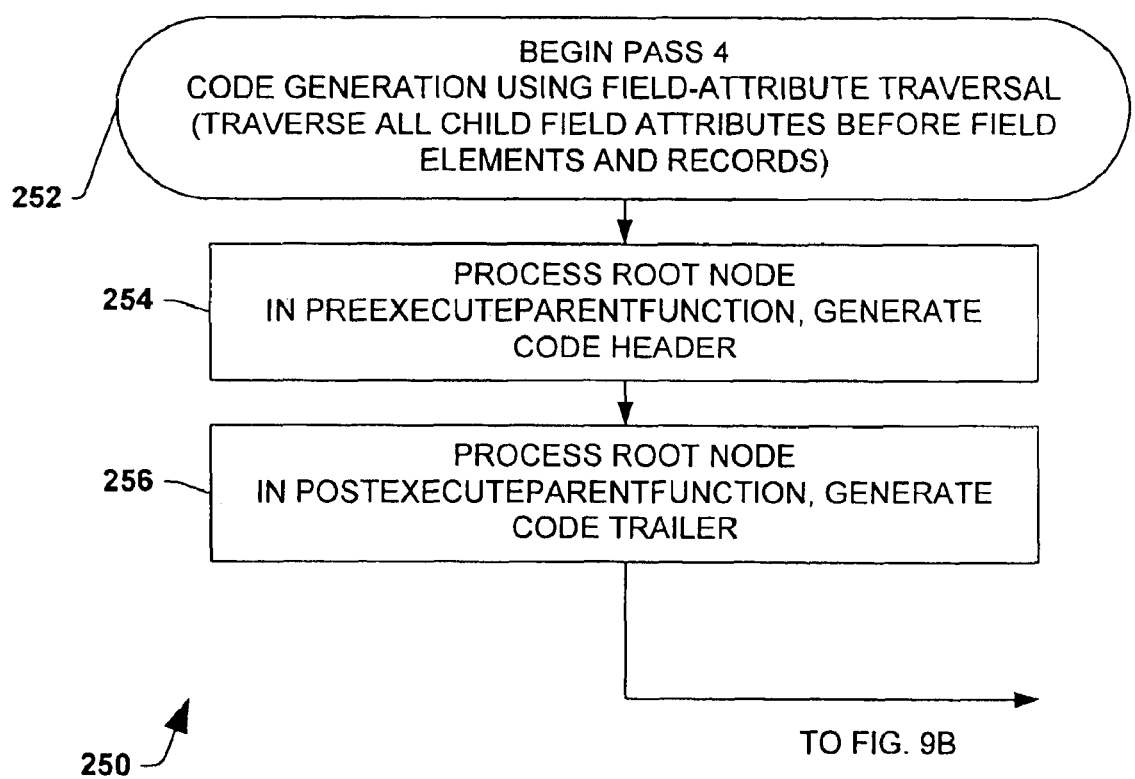
FIG. 9A is a flow diagram illustrating an exemplary fourth pass of an exemplary compiler method in accordance with the invention.

Referring now to FIG. 9A, an exemplary code generation pass 4 (250) is illustrated in which field-attribute traversal in employed. By this method, all child field attributes are traversed before field elements and records are traversed. It will be appreciated that although the exemplary code generation methodology illustrated in FIGS. 9A–9D generates XSL or XSLT code, many other code languages may be generated by the methods and systems of the present invention, which represent a mapping between documents and/or schemas. Beginning at step 252, the compiler processes the target tree root node in a pre-execute parent function (not shown) at step 254, thereby generating a code header. Thereafter, a code trailer is generated in a post-execute parent function at step 256.

Figure 9B:
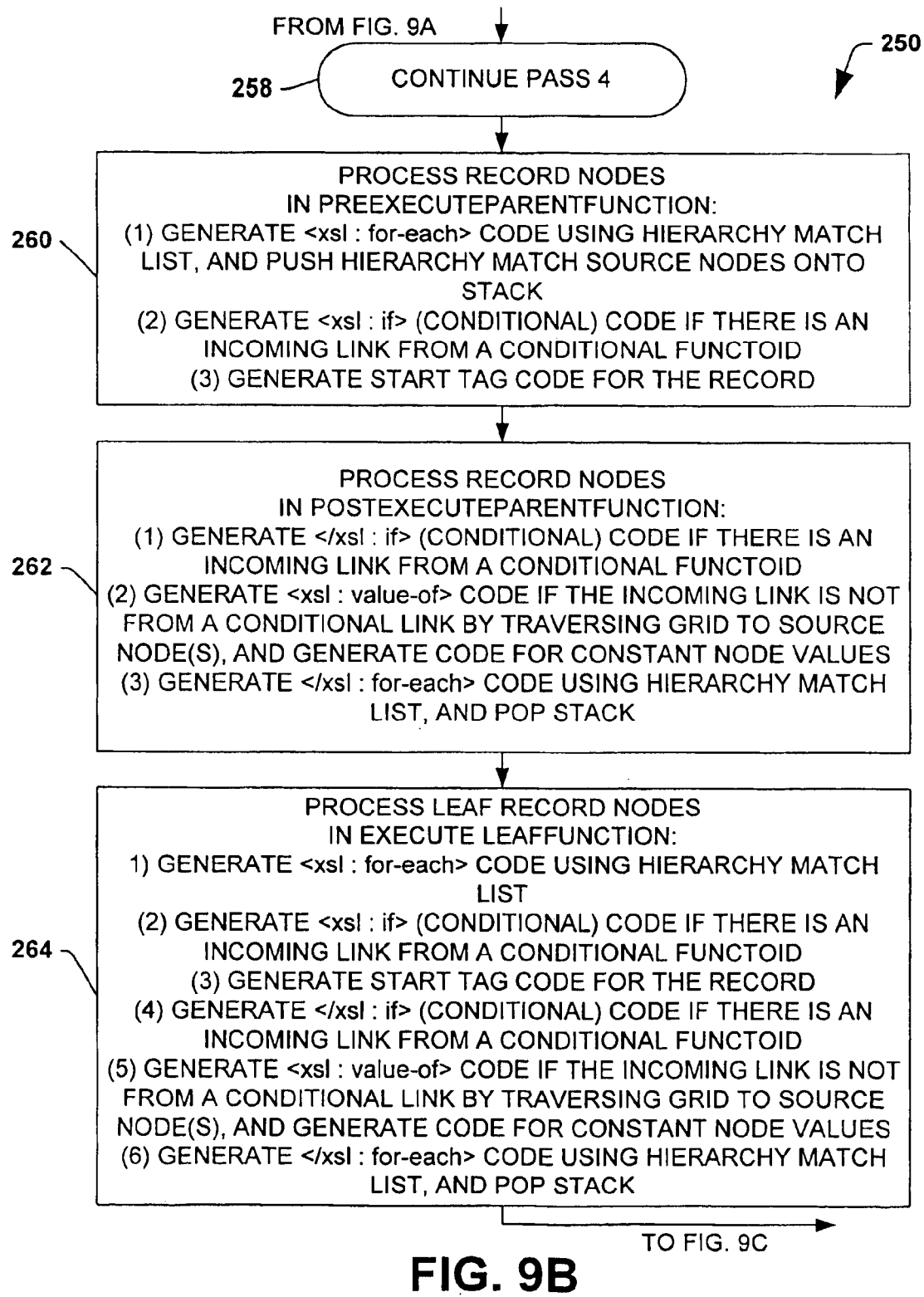
FIG. 9B is a flow diagram further illustrating the fourth pass of the method of FIG. 9A.

Referring also to FIG. 9B, pass 4 (250) is continued at step 258. At step 260, record nodes are processed in the pre-execute parent function wherein the compiler generates <xsl:for-each> code using the hierarchy match list associated therewith, generates <xsl:if> (conditional) code if there is an incoming link from a conditional functoid (e.g., as illustrated and discussed further with respect to FIG. 14 infra) and generates a start tag code for the record at step 260. For example, <xsl:for-each> code is generated for each of the hierarchy matches in a hierarchy match list associated with a target tree node.

A hierarchy stack (not shown) may be employed to determine what context the compiler is in at any given time during the compiler method. For example, the hierarchy matches from a hierarchy match list may be pushed onto the stack at step 260, and removed therefrom (e.g., popped) as they are used in the code generation pass of the method at step 262, as discussed in greater detail hereinafter. Once step 260 is completed, the compiler processes record nodes in the post-execute parent function at step 262. Therein the compiler generates </xsl:if> (conditional) code if there is an incoming link from a condition functoid, and generates <xsl:value-of> code if the incoming link is not from a conditional link by traversing the mapping to source nodes, generates code for constant node values, and generates </xsl:for-each> code using the hierarchy match list. Where a stack is used to determine context and to generate relative path names, the stack may be popped at this point.

Thereafter at step 264, leaf record nodes are processed in an execute leaf function, wherein the compiler generates <xsl:for-each> code using the hierarchy match list, generates <xsl:if> (conditional) code if there is an incoming link from a condition functoid, and generates a start tag code for the record. Also at step 264, the compiler generates </xsl:if> (conditional) code if there is an incoming link from a conditional functoid, generates <xsl:value of > code if the incoming link is not from a conditional link by traversing the (e.g., mapping) to source nodes, generates code for constant node values, and generates <xsl:for-each> code using the hierarchy match list.

Figure 9C:
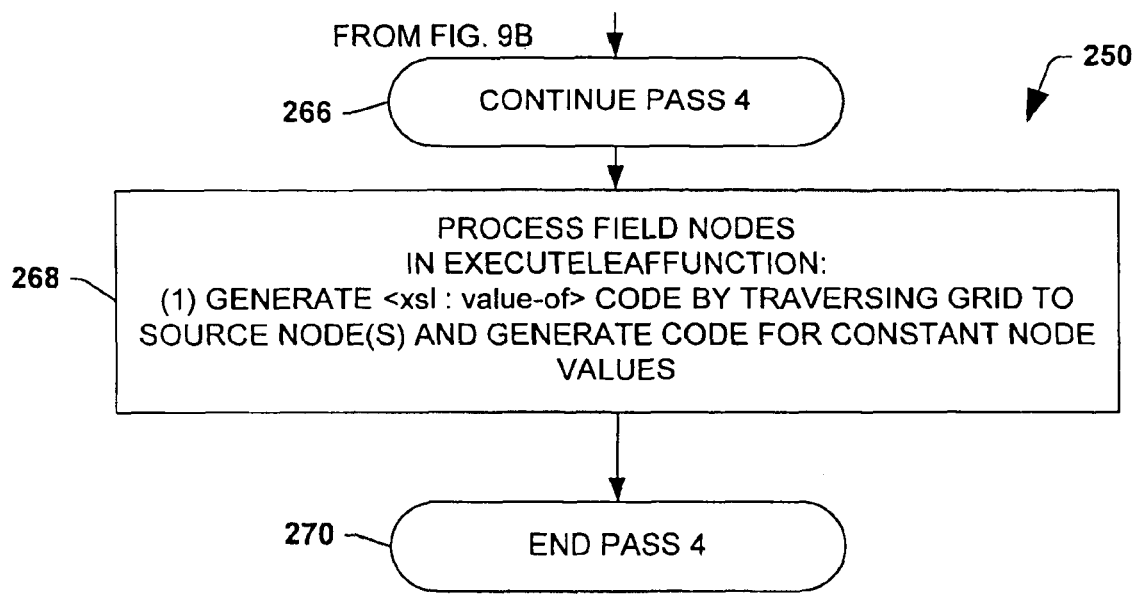
FIG. 9C is a flow diagram further illustrating the fourth pass of the method of FIGS. 9A–9B.
Figure 9D:
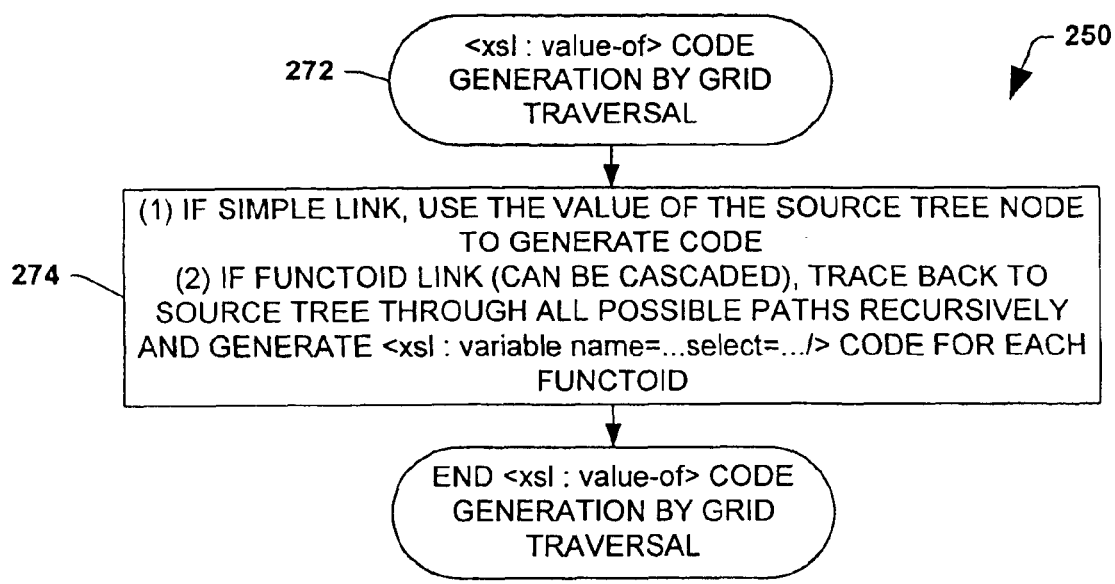
FIG. 9D is a flow diagram further illustrating the fourth pass of the method of FIGS. 9A–9C.

Referring also to FIGS. 9C and 9D, pass 4 (250) continues at step 266 after which field nodes are processed in the execute leaf function at step 268, where the code generates <xsl:value-of> code by traversing the (e.g., mapping) to source nodes and generating code for constant node values before pass 4 (250) ends at step 270. In FIG. 9D, the generation of <xsl:value-of> code by grid (e.g., mapping) traversal begins at step 272. At step 274 if the link to the target node is simple (e.g., a line directly connecting a source tree node with a target tree node in a visual mapping), the compiler will use the value of the source tree node to generate the code. If a functoid link has been defined with respect to the target node, the compiler will trace back to the source tree through all possible paths recursively and generate <xsl:variable name=. . . select=. . . /> code for each functoid at step 274. In this regard, where functoids are cascaded (e.g., mapping 380 of FIG. 13), the variable code generated for earlier occurrences of the same functoid in the same context may advantageously be reused via a functoid stack during the code generation pass 4 (250).

PASS 5—FREE MEMORY

Figure 10:
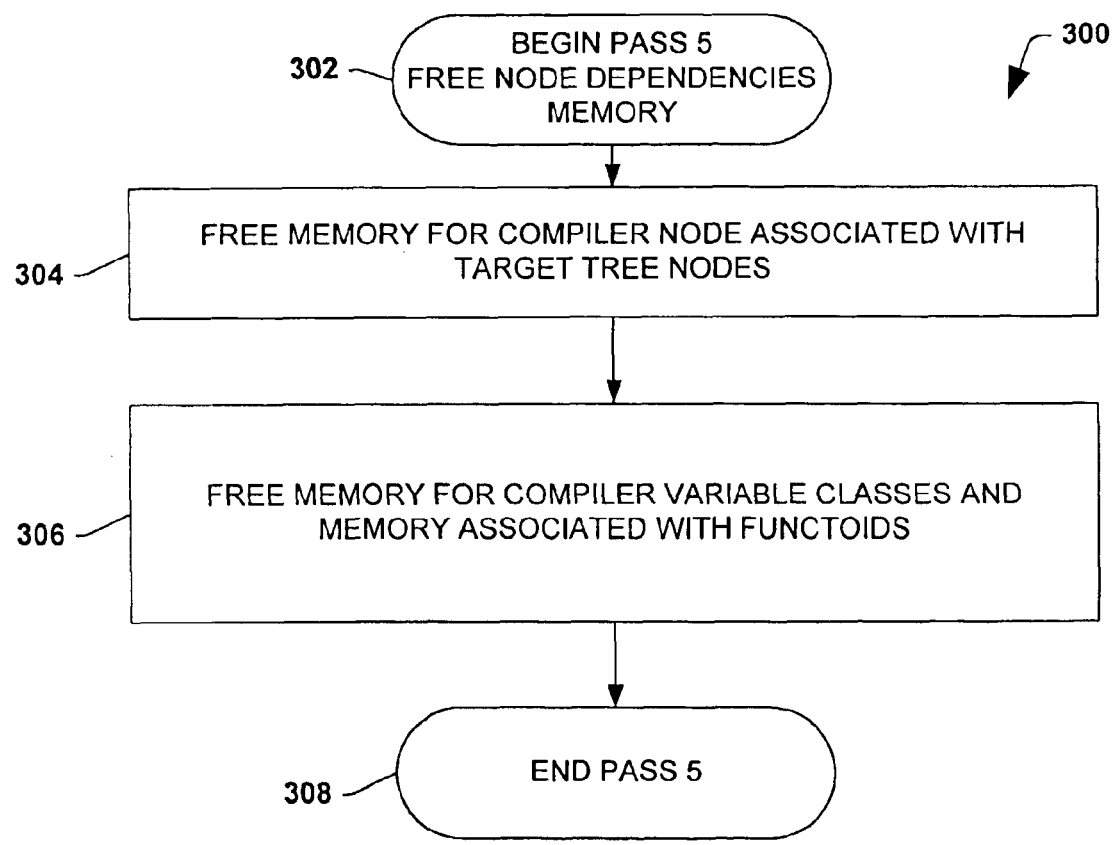
FIG. 10 is a flow diagram illustrating an exemplary fifth pass of an exemplary compiler method in accordance with the invention.

Referring now to FIG. 10, once the code has been generated in pass 4 (250), pass 5 (300) begins at step 302. In pass 5 (300), the compiler frees memory for compiler nodes associated with target tree nodes at step 304 and frees memory for compiler variable classes and memory associated with functoids at step 306 before pass 5 (300) ends at step 308. This ends the exemplary multi-pass compiler method comprising passes 30, 50, 150, 250, and 300, in which XSL or XSLT code may be generated to represent a mapping between document schemas. Many other embodiments of the invention are possible, including, for example, code generation passes generating code in other than XSL or XSLT languages.

Figure 11:
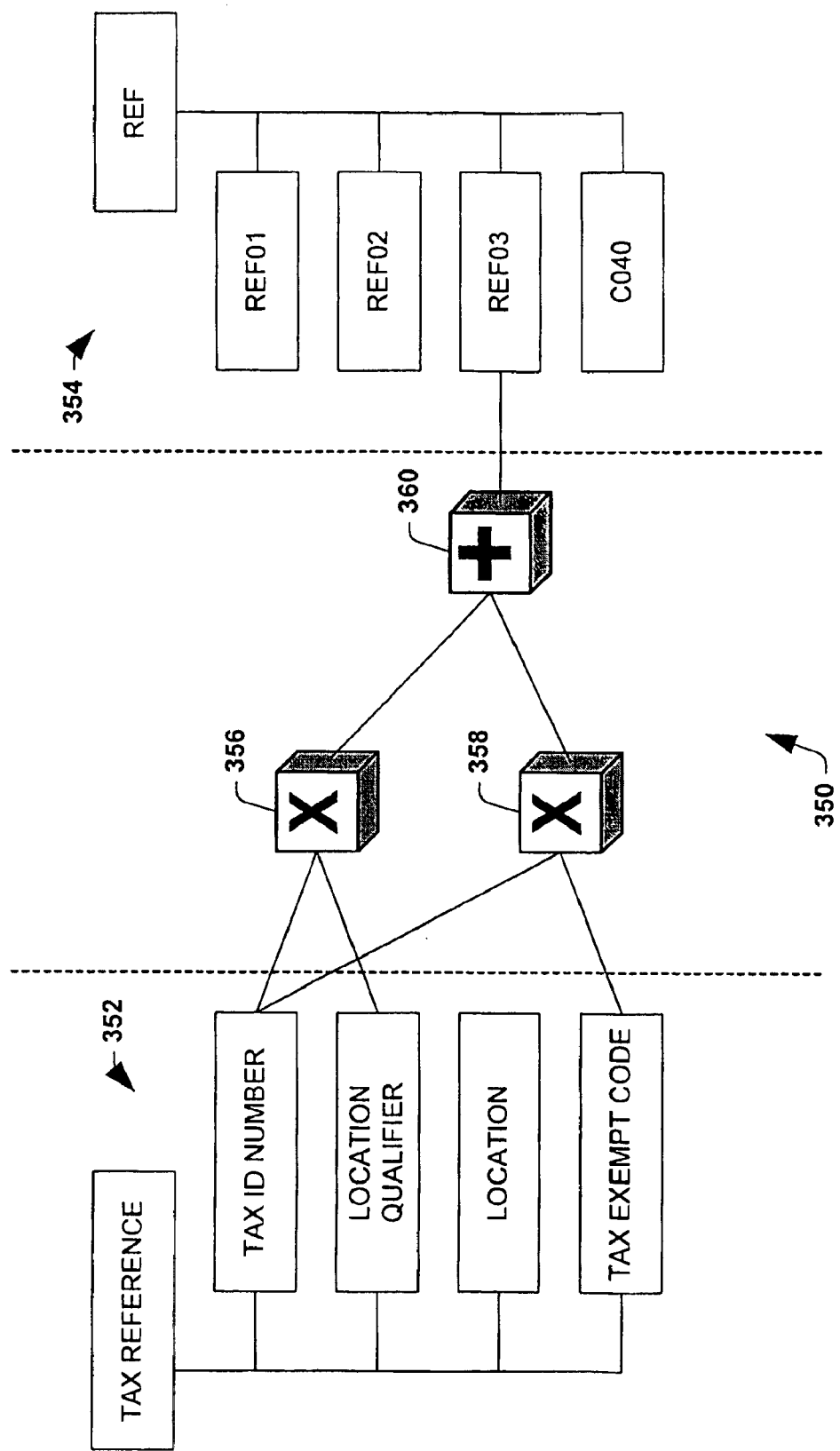
FIG. 11 is a schematic diagram illustrating an exemplary mapping in accordance with the invention.

FIG. 11 illustrates an exemplary mapping 350 of a source tree 352 and a target tree 354. The source tree 352 may be a source schema that is a definition of an XML document. Similarly, the target tree 354 may be a target schema representing another XML document. A mapping definition tool (not shown) allows a user to graphically specify data transformations from the source tree schema 350 to the target schema 354. The methods and system of the present invention may be used, for example, to take the visual mapping representations of FIG. 11 and create a coded representation of the map. In accordance with one aspect of the invention, the coded mapping representation may be an XSL style sheet.

The exemplary mapping 350 includes multiplication functoids 356 and 358, as well an addition functoid 360. In this example, the value of TAX ID NUMBER from the source tree 352 is multiplied with the value of LOCATION QUALIFIER, using the multiplication functoid 356. In like manner, the value of TAX ID NUMBER is multiplied with the value of TAX EXEMPT CODE using the multiplication functoid 358. The result of these two multiplications is fed as an input to the addition functoid 360. The output of the addition functoid 360 is then linked to the REF03 field node in the target schema tree 354. It will be recognized in this regard that the compiler methods and systems of the present invention may be used to generate codes according to mappings, graphical and otherwise, employing a variety of functoids, and that the scope of the current invention is not limited to use with the functoids illustrated and described herein.

Figure 12:
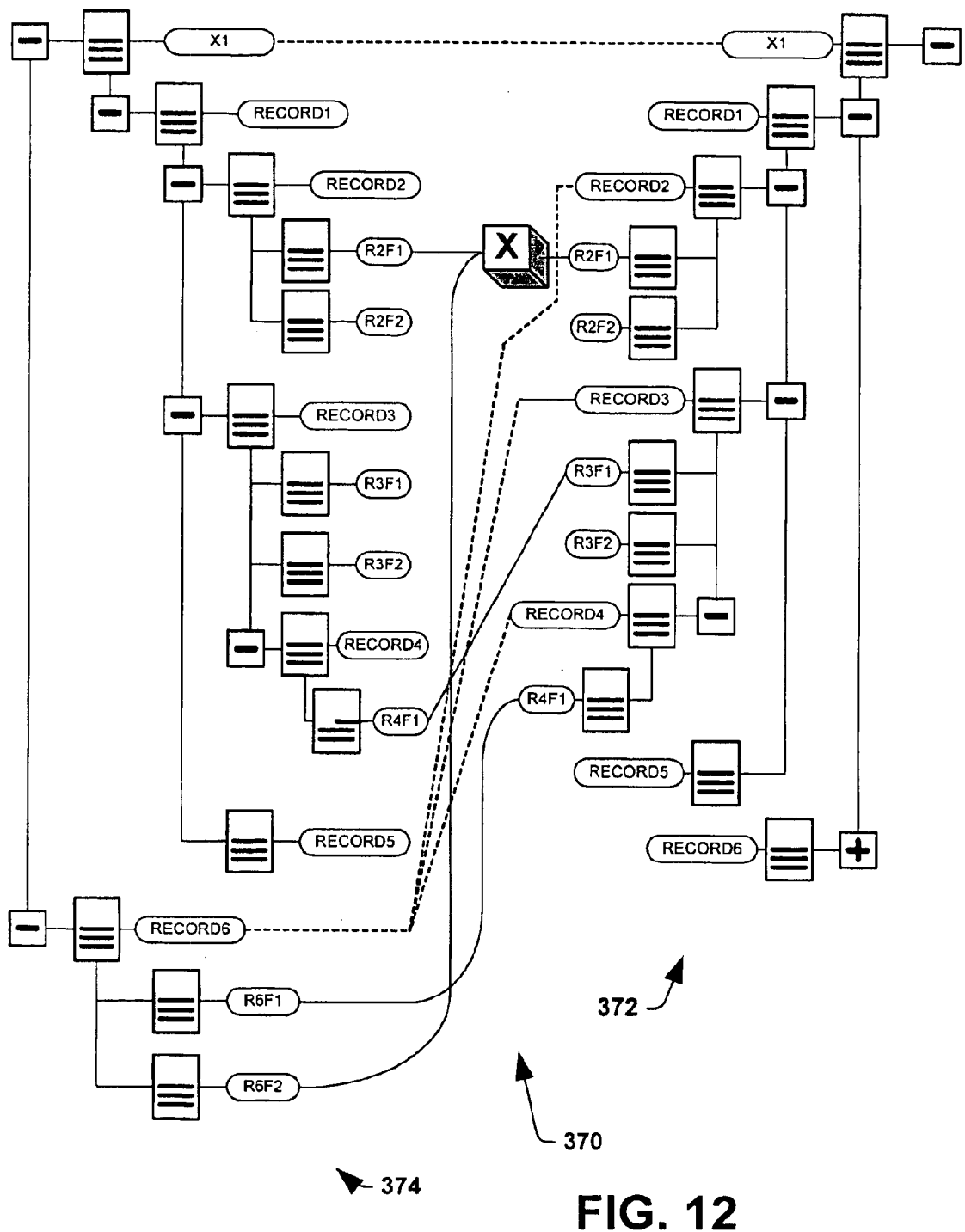
FIG. 12 is a schematic diagram illustrating another mapping in accordance with the invention.

Referring now to FIG. 12, another exemplary mapping 370 is illustrated between a target tree 372 and a source tree 374. Referring also to FIGS. 4A–4H, the mapping 370 has multiple source loop paths (e.g., source tree nodes X1 and RECORD6 via target tree nodes RECORD2 and RECORD3) for which the compiler in pass 2 (50) may generate a compiler error during selection of correct source loop path. Likewise, in the exemplary methodology of FIG. 1, pass 2 at step 8 includes multiple source loop path detection. In accordance with one aspect of the present invention, the compiler in this example may generate an error or warning such as the following:

Completed Compile.

Warning: target node RECORD2 has multiple source loop paths.

Warning: target node RECORD3 has multiple source loop paths.

XSL Compiler-2 warnings.

Figure 13:
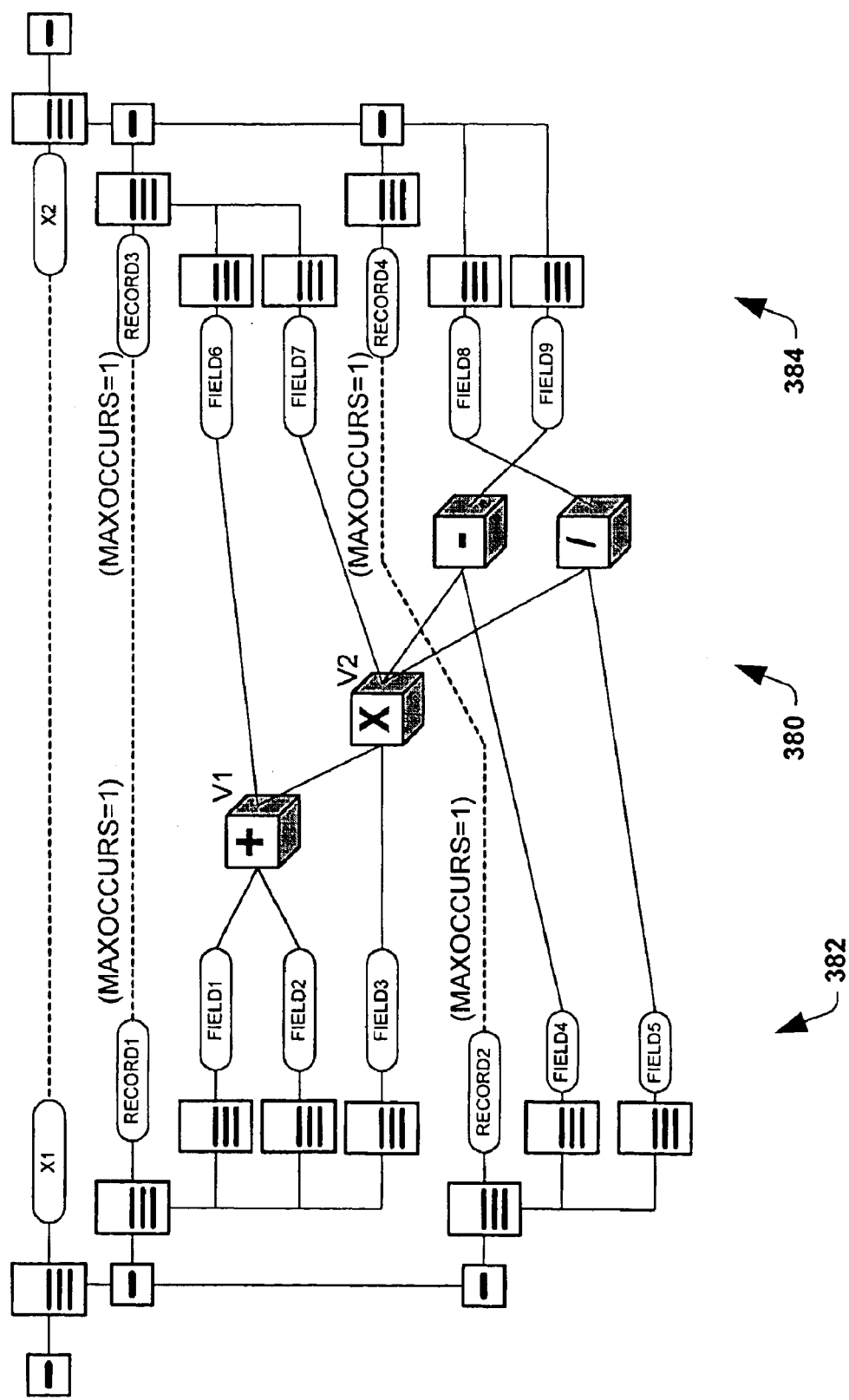
FIG. 13 is a schematic diagram illustrating another mapping in accordance with the invention.

Referring now to FIG. 13, another exemplary mapping 380 is illustrated between a source schema tree 382 and a target schema tree 384 having cascaded functoids. Using the compiler method illustrated in FIGS. 3–5, a compiler (not shown) may generate a coded representation of the mapping 380 for execution in a computer system (not shown). As an example, such a compiler may generate the following code in XSL for the mapping 380.

```
<xsl:stylesheet xmlns:xsl='http://www.w3.org/1999/XSL/Transform'
xmlns:msxsl='urn:schemas-microsoft-com.xslt' xmlns:var='urn:var'
xmlns:user='urn:user' version='1.0>
<xsl:output method='xml' indent='yes' omit-xml-declaration='yes'/>
xsl:template match='/'>
        <xsl:apply-templates select='X1"/>
</xsl:template>
<xsl:template match='X1'>
<X2>
        <xsl:for-each select='Record1'>
            <Record3>
                <xsl:variable name='var:v1'
select='user:fctmathadd2(string(@Field1),string(@Field2))'/>
                <xsl:attribute name='Field6'> <xsl:value-of select='$var:v1'/> </xsl:attribute>
                <xsl:variable name='var:v2'
select='user:fctmathmultiply2(string(@Field3),string($var:v1))'/>
                <xsl:attribute name='Field7'> <xsl:value-of select='$var:v2'/> </xsl:attribute>
            </Record3>
        </xsl:for-each>
        <xsl:for-each select='Record1'>
            <Record4>
                <xsl:variable name='var:v3'
select='user:fctmathadd2(string(@Field1),string(@Field2))'/>
                <xsl:variable name='var:v4'
select='user:fctmathmultiply2(string(@Field3),string($var:v3))'/>
                <xsl:variable name='var:v5'
select='user:fctmathdivide(string($var:v4),string(ancestor::*[1]/Record2/@Field5))'/>
                <xsl:attribute name='Field8'> <xsl:value-of select='$var:v5'/> </xsl:attribute>
                <xsl:variable name='var:v6'
select='user:fctmathsubtract2(string($var:v4),string(ancestor::*[1]/Record2/@Field4))'/>
                <xsl:attribute name='Field9'> <xsl:value-of select='$var:v6'/> </xsl:atttribute>
            </Record4>
        </xsl:for-each>
```

-continued

```
</X2>
</xsl:template>
<msxsl:script language='VBScript' implements-prefix='user'>
<![CDATA[
Function FctMathAdd2( p_strparm0, p_strparm1 )
    If( IsNumeric( p_strparm0 ) And IsNumeric( p_strparm1 ) ) Then
        FctMathAdd2 = CDb1( p_strparm0) + CDb1(P_strparm1 )
    Else
        FctMathAdd2 = " "
    End If
End Function
Function FctMathMultiply2( p_strparm0, p_strparm1 )
    If( IsNumeric( p_strparm0 ) And IsNumeric( p_strpRM1 ) ) Then
        FctMathMultiply2 = CDb1( p_strparm0 ) * CDb1( p_strparm1 )
    Else
        FctMathMultiply2 = " "
    End If
End Function
Function FctMathSubtract2( p_strparm0, p_strparm1 )
    If( IsNumeric( p_strparm0 ) And IsNumeric( p_strparm1 ) ) Then
        FctmathSubtract2 = CDb1( p_strparm0 ) - CDb1( p_strparm1 )
    Else
        FctMathubtract2 = " "
    End If
End Function
Function FctMathDivide( p_strA, p_strB )
    If) IsNumeric( p_strA ) And IsNumeric( p_strB ) ) Then
        db1Denominator = CDb1 ( p_strB )
        If( db1Denominator = 0 ) Then
            FctMathDivide = " "
        Else
            FctMathDivide = CDb1( p_strA ) / db1Denominator
        End If
    Else
        FctMathDivide = " "
    End If
EndFunction
]]>
</msxsl:script>
</xsl:stylesheet>
```

Given the following sample source instance:

```
<X1>
    <Record1 Field="10" Field2= "20" Field3= "30"/>
    <Record2 Field4="40" Field5="50"/>
</X1>
```

Transforming using the compiler generated XSL map, the sample target instance output is as follows:

```
<X2>
    <Record3 Field6="30" Field7="900" />
    <Record4 Field8="18" Field9="860" />
</X2>
```

Figure 14:
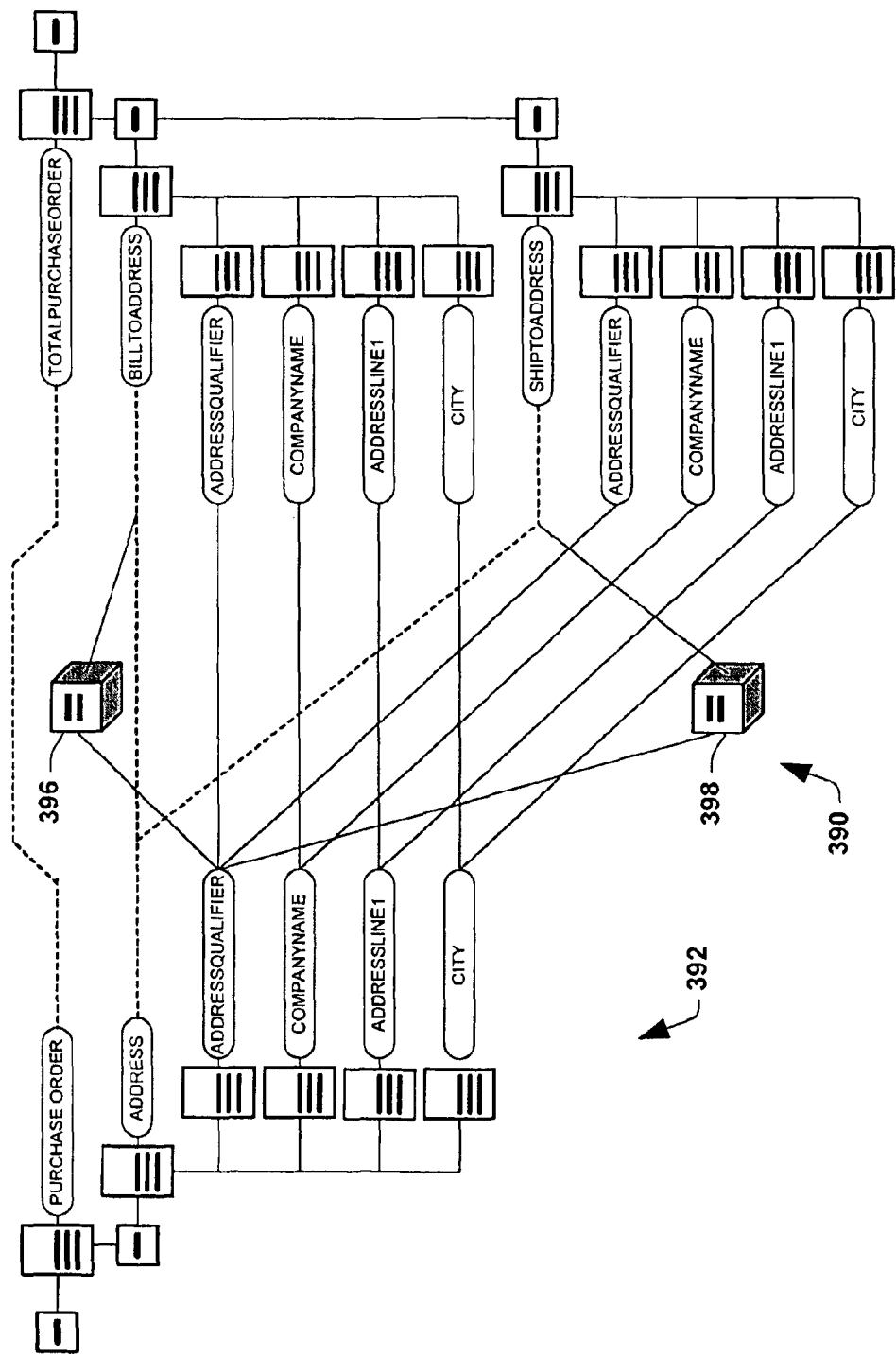
FIG. 14 is a schematic diagram illustrating another mapping in accordance with the invention.

Referring now to FIG. 14, another exemplary mapping 390 is illustrated between a target tree 394 and a source tree 392, wherein the mapping 390 may include conditional functoids 396 and 398 as illustrated in the Figure. In the example, the conditional functoid 396 is linked to an ADDRESSQUALIFIER node in the source tree 392, and to a BILLTOADDRESS node in the target tree 394. The functoid 396 has another input (not shown) having a value of BT, and the other conditional functoid 398 has a second input (not shown) with a value of ST. This configuration may be used, for example, at run time to determine whether the address qualifier field of a particular source document is set to BT or ST, and to provide the company name address line 1, and city associated with the document to either the BILLTOADDRESS or the SHIPTOADDRESS records of the target document, respectively. As an illustration of the compiler methodology regarding conditional functoids, the following exemplary compiler output code is provided in XSL:

```
Starting Compile . . .
<xsl:stylesheet xmlns:xsl='http://www.w3.org/1999/XSL/Trnsform'
xmlns:msxsl='urn:schemas-microsoft-com:xslt' xmlns:var='urn:var'
xmlns:user='urn:user' version='1.0'>
<xsl:output method='xml' indent-'yes' omit-xml-declaration='yes'/>
<xsl:template match='/'>
    <xsl:apply-templates select='PurchaseOrder'/>
</xsl:template>
<xsl:template match='PurchaseOrder'>
<TargetPurchase>
    <xsl:for-each select='Address'>
        <xsl:variable name='var:v1'
select='user:FctEqual(string(@AddressQualifier),"BT")'/>
        <xsl:if test='$var:v1'>
            <BillToAddress>
                <!--Connection from Source Node 'AddressQualifier'
to Destination Node 'AddressQualifier'-->
                <xsl:attribute name='AddressQualifier'> <xsl:value-of
select='@AddressQualifier'/> <(/xsl:attribute>
                <!--Connection from Source Node 'CompanyName' to
Destination Node 'CompanyName'→
                <xsl:attribute name='CompanyName'> <xsl:value-of
select='@CompanyName'/> </xsl:attribute>
                <!--Connection from Source Node 'AddresLine1' to
Destination Node 'AddressLine1'→
                <xsl:attribute name='AddressLine1'> <xsl:value-of
select='@AddressLine1'/> </xsl:attribute>
                <!--Connection from Source Node 'City' to
```

```
                                                    -continued
Destination Node 'City'→
            <xsl:attribute name='City'> <xsl:value-of
select='@City'/> </xsl:attribute>
            </BillToAddress>
        </xsl:if>
    </xsl:for-each>
    <xsl:for-each select='Address'>
        <xsl:variable name='var:v2'
select='user:FctEqual(string(@AddressQualifier), "ST")'/>
        <xsl:if test='$var:v2'>
            <ShipToAddress>
                <!--Connection from Source Node 'AddressQualifier'
to Destination Node 'AddressQualifier'→
                <xsl:attribute name='AddressQualifier'> <xsl:value-of
select='@AddressQualifier'/> </xsl:attribute>
                <!--Connection from Source Node 'CompanyName' to
Destination Node 'CompanyName'→
                <xsl:attribute name='CompanyName'> <xsl:value-of
select='@CompanyName'/> </xsl:attribute>
                <!--Connection from Source Node 'AddressLine1' to
Destination Node 'AddressLine 1'→
                <xsl"attribute name='AddressLine1'> <xsl:value-of
select='@AddressLine1'/> </xsl:attribute>
                <!--Connection from Source Node 'City' to
Destination Node 'City'→
                <xsl:attribute name='City'> <xsl:value-of
select+'@City'/> </xsl:attribute>
            </ShipToAddress>
        </xsl:if>
    </xsl:for-each>
</TotalPurchase>
</xsl:template>
<msxsl:script language='VBScript' implements-prefix='user'>
<![CDATA[
FunctionFctEqual( p_strA, p_strB )
 If Lcase( p_strA ) = "true" Then
  p_strA = true
 ElseIf Lcase( p_strA ) = "false" Then
  p_strA = false
 End If
 If LCase( p_strB ) = "true" Then
  p_strB = true
 ElseIf Lcase(p_strB ) = "false" Then
  p_strB = false
 End If
 If ( IsNumeric( p_strA ) And IsNumeric( p_strB ) ) Then
  p_strA = CDbl( p_strA)
  p_strB = CDbl( p_strB )
 End If
 If(p_strA = p_strB ) Then
  FctEqual = true
 Else
  FctEqual = False
 End If
Enc Function
]]>
</msxsl:script>
</xsl;stylesheet>
```

Giving the following sample source instance:

```
<PurchaseOrder>
<Address AddressQualifier="AddressQualifier_1" CompanyName="CompanyName_1"
AddressLine1="AddressLine1_1" City="City_1">ST</Address>
<Address AddressQualifier="AddressQualifier_2" CompanyName="CompanyName_2"
AddressLine1="Addressline1_2" City=City_2">BT</Address>
</PurchaseOrder>
```

Transforming using the compiler generated XSL map, the sample target instance output is as follows:

```
<TotalPurchase>
<ShipToAddress AddressQualifier="AddressQualifier_1" CompanyName="CompanyName_1"
AddressLine1="AddressLine1_1" City="City_1" />
<BillToAddress AddressQualifier="AddressQualifier_2" CompanyName="CompanyName_2"
AddressLine1="AddressLine1_2" City="City_2" />
</TotalPurchase>
```

EXEMPLARY OPERATING ENVIRONMENT

Figure 15:
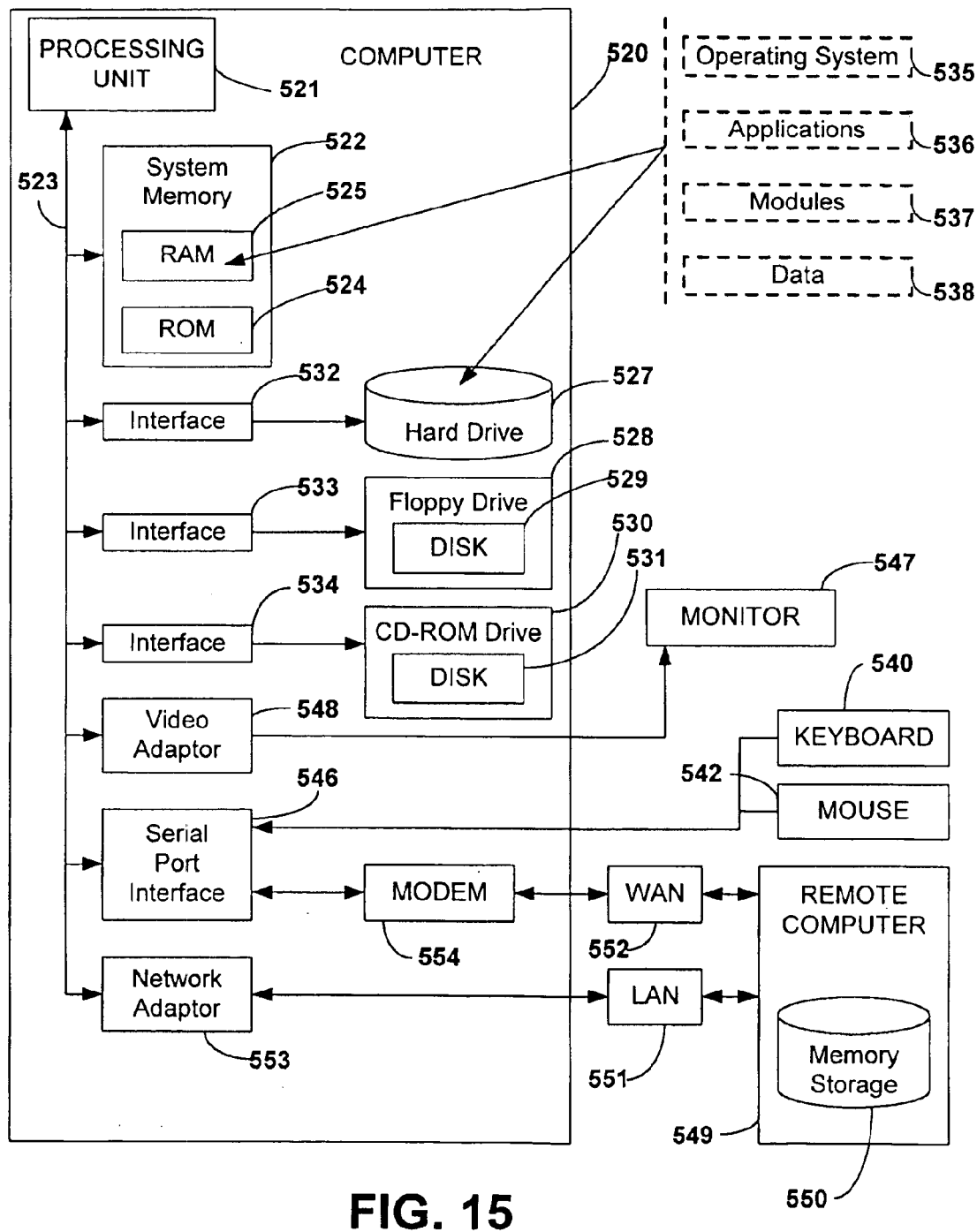
FIG. 15 is a schematic diagram illustrating an exemplary operating environment in which the invention may be implemented.

In order to provide a context for the various aspects of the invention, FIG. 15 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personnel computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 15, an exemplary system for implementing the various aspects of the invention includes a conventional server computer 520, including a processing unit 521, a system memory 522, and a system bus 523 that couples various system components including the system memory to the processing unit 521. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 521.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 524 and random access memory (RAM) 525. A basic input/output system (BIOS), containing the basic routines that help to transfer information between elements within the server computer 520, such as during start-up, is stored in ROM 524.

The server computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions, etc. for the server computer 520. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 525, including an operating system 535, one or more application programs 536, other program modules 537, and program data 538. The operating system 535 in the illustrated computer may be the Microsoft Windows 2000 Server operating system, together with the before mentioned Microsoft Transaction Server.

A user may enter commands and information into the server computer 520 through a keyboard 540 and a pointing device, such as a mouse 542. Other input devices (not shown) may include a microphone, a joystick, a game pad, a satellite dish, a scanner, or the like. These and other input devices are often connected to the processing unit 521 through a serial port interface 546 that is coupled to the system bus, but may be connected by other interfaces, such as a parallel port, a game port or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The server computer 250 may operate in a networked environment using logical connections to one or more remote computers, such as a remote client computer 549. The remote computer 549 may be a workstation, a server computer, a router, a peer device or other common network node, and typically includes many or all of the elements described relative to the server computer 520, although only a memory storage device 550 is illustrated in FIG. 15. The logical connections depicted in FIG. 15 include a local area network (LAN) 551 and a wide area network (WAN) 552. Such networking environments are commonplace in offices, enterprise- wide computer networks, intranets and the Internet.

When used in a LAN networking environment, the server computer 520 is connected to the local network 551 through a network interface or adapter 553. When used in a WAN networking environment, the server computer 520 typically includes a modem 554, or is connected to a communications server on the LAN, or has other means for establishing communications over the wide area network 552, such as the Internet. The modem 554, which may be internal or external, is connected to the system bus 523 via the serial port interface 546. In a networked environment, program modules depicted relative to the server computer 520, or portions thereof, may be stored in the remote memory storage device.

It will be appreciated that the network connections shown are exemplary and other means of establishing a communications link between the computers may be used. In accordance with the practices of persons skilled in the art of computer programming, the present invention has been described with reference to acts and symbolic representations of operations that are performed by a computer, such as the server computer 520, unless otherwise indicated. Such acts and operations are sometimes referred to as being computer-executed. It will be appreciated that the acts and symbolically represented operations include the manipulation by the processing unit 521 of electrical signals representing data bits which causes a resulting transformation or reduction of the electrical signal representation, and the maintenance of data bits at memory locations in the memory system (including the system memory 522, hard drive 527, floppy disks 529, and CD-ROM 531) to thereby reconfigure or otherwise alter the computer system's operation, as well as other processing of signals. The memory locations where such data bits are maintained are physical locations that have particular electrical, magnetic, or optical properties corresponding to the data bits.

Although the invention has been shown and described with respect to a certain embodiments, it will be appreciated that equivalent alterations and modifications will occur to other skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In this regard, it will also be recognized that the invention includes a computer-readable medium having computer-executable instructions for performing the steps of the various methods of the invention.

In addition, while a particular feature of the invention may have been disclosed with respect to only one of several embodiments, such feature may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A method of generating code representing a mapping between a source schema, and a target schema, the source schema comprising a source tree having a source node and the target schema comprising a target tree having a target node, the method comprising:
    initializing node dependencies memory comprising:
        allocating memory for a compiler node;
        associating the compiler node with the target node;
        allocating memory for compiler variable classes; and
        associating compiler variable classes with functoids;
    determining source node dependencies for the target node by tracing from the target node through the mapping to the source schema, wherein the mapping comprises defined data transformations from the source schema to the target schema, and wherein determining source node dependencies comprises:
        creating a target dependencies list for the target node;
        creating a source dependencies list for the target node;
        tracing back to the source tree through all possible paths recursively, adding source tree nodes to corresponding source dependencies lists;
        setting a flag for the compiler nodes associated with the target node and an associated parent compiler node if there is a path from the target tree node to the source tree;
        adding the target tree node to the target dependency list of an associated parent record node if the target node is a field node;
        consolidating the target dependency list for target record nodes;
        consolidating the source dependency list for target record nodes;
        selecting a source loop path node for the target node according to the consolidated source dependency lists; and
        storing the source loop path node in the compiler node associated with the target node;
    matching hierarchy by generating a hierarchy match list for the target node; and
    generating code according to the hierarchy match list.

2. The method of claim 1, wherein consolidating the target dependency list for target record nodes comprised adding child record nodes to the target dependency list if the target record node has a child field node with a flag set and the target record node has a child record node with a flag set, and wherein consolidating the source dependency list for target record nodes comprises adding source dependencies of each node in the target dependency list to the target dependency list.

3. The method of claim 2, wherein selecting a source loop path node for the target node according to the consolidated source dependency list comprises:
    iterating through source nodes in the source dependency list;
    finding the highest level loop point for which more than one occurrence of the source node is possible;
    storing the current node in the source dependency list as the source loop path node if no loop point is found;
    storing the current node in the source dependency list as the source loop path node if the current loop point is at a higher level than the previous loop point and if the paths to the previous and current loop points converge;
    storing the previous node in the source dependency list as the source loop path node if the current loop point is at a lower level than the previous loop point and if the paths to the previous and current loop points converge;
    storing the current node in the source dependency list as the source loop path node if the current loop point is at the same level as the previous loop point, and if the paths to the previous and current loop points converge;
    generating a compiler error if the paths to the previous and current loop points do not converge.

4. The method of claim 3, wherein finding the highest level loop point for which more than one occurrence of the source node is possible comprises finding the highest level loop point for which maxoccurs =*.

5. The method of claim 3, wherein storing the source loop path node in the compiler node associated with the target node comprises:
    storing the source loop path node as the source loop path node in the compiler node if the source loop path node is a record node; and
    storing the parent record node of the source loop path bode as the source loop path node in the compiler node if the source loop path node is a field node.

6. The method of claim 5, wherein matching hierarchy by generating a hierarchy match list for the target node comprises:

creating a hierarchy match list for the target node if the target node has a source loop path node;

determining a consolidated compiler link option using links on target node dependencies; and matching hierarchy according to the consolidated compiler link option.

7. The method of claim 6, wherein matching hierarchy according to the consolidated compiler link option comprises:

climbing up the source tree from the source loop path node, adding each source node to the hierarchy match list for the target node if the compiler link option is flattening;

traversing up the source tree until the source tree node level matches the target node level, adding source tree nodes to the hierarchy match list if the target node level is greater than the source loop path node level and if the compiler link option is top-down;

traversing up the target tree until the source tree node level matches the target node level, adding the source loop path node to the hierarchy match list of each target node traversed if the source loop path node level is greater than the target node level and if the compiler link option is top-down;

traversing up the source and target trees, adding source tree nodes to the hierarchy match lists of target nodes level by level if the compiler link option is top-down;

traversing up the source and target trees, adding source nodes to the hierarchy match lists of target nodes until level 1 of either the source or the target tree is reached if the compiler link option is bottom-up;

traversing up the source tree, adding the source tree node to the hierarchy match lists of the target tree nodes if the compiler link option is bottom-up and if level 1 of the target tree is reached; and traversing up the source tree, adding the source tree nodes to the hierarchy match list of the target node.

8. The method of claim 7, wherein generating code according to the hierarchy match list comprises:

generating a code header for a root node;

generating a code trailer for the root node;

processing target record nodes in a preexecuteparent function, a postexecuteparent function, and an executeleaf function; and processing filed nodes in the executeleaf function.

9. The method of claim 8, wherein processing target record nodes in a preexecuteparent function, a postexecuteparent function, and an executeleaf function comprises:

generating <xsl:for-each> code in the preexecuteparent function using the hierarchy match list;

generating <xsl:if> code in the preexecute parent function if there is an incoming link from a conditional functoid;

generating a start tag code for the target record node in the preexecuteparent function;

generating </xsl:if> code in the postexecuteparent function for record nodes if there is an incoming link from a conditional functoid;

generating <xsl:value-of> code in the postexecuteparent function for record nodes if the incoming link is not from a conditional link by traversing a grid to source nodes; and generating code for constant node values;

generating <xsl:for-each> code in the postexecuteparent function for record nodes using the hierarchy match list;

generating <xsl:for-each> code in the executeleaf function for leaf record nodes using the hierarchy match list;

generating <xsl:if> code in the executeleaf function for leaf record nodes if there is an incoming link from a conditional functoid;

generating a start tag code in the executeleaf function for leaf records;

generating <xsl:if> code in the executeleaf function for leaf record nodes if there is an incoming link from a conditional functoid;

generating <xsl:value-of> code in the executeleaf function for leaf record nodes if the incoming link is not from a conditional link by traversing the grid to source nodes, and generating code for constant node values; and generating <xsl:value-of> code in the executeleaf function for field nodes by traversing grid to source nodes, and generating code for constant node values.

10. The method of claim 9, wherein generating <xsl:value-of> code comprises:

using the value of a source tree node to generate code if the link is simple; and tracing back to the source tree through all possible paths recursively and generating <xsl:variable name=. . . select=. . . /> code for each functoid if there is a functoid link.

11. The method of claim 10, wherein determining source node dependencies for the target node by tracing from the target node through the mapping to the source schema comprised depth-first tree traversal of the target tree, matching hierarchy by generating a hierarchy match list for the target node comprises depth-first tree traversal of the target tree, and wherein generating code according to the hierarchy match list comprises field-attribute tree traversal of the target tree.

12. The method of claim 8, wherein processing target record nodes in a preexecuteparent function, a postexecuteparent function, and an executeleaf function comprises:

generating looping start code in the preexecuteparent function using the hierarchy match list;

generating conditional start code in the preexecuteparent function if there is an incoming link from a conditional functoid;

generating a start tag code for the target record node in the preexecuteparent function;

generating conditional end code in the postexecuteparent function for record nodes if there is an incoming link from a conditional functoid;

generating value code in the postexecuteparent function for record nodes if the incoming link is not from a conditional link by traversing a grid to a source nodes, and generating code for constant node values;

generating looping end code in the postexecuteparent function for record nodes using the hierarchy match list;

generating looping start code in the executeleaf function for leaf record nodes using the hierarchy match list;

generating conditional start code in the executeleaf function for leaf record nodes if there is an incoming link from a conditional functoid;

generating a start tag code in the executeleaf function for leaf records;

generating conditional end code in the executeleaf function for leaf record nodes if there is an incoming link from a conditional functoid;

generating value code in the executeleaf function for leaf record nodes if the incoming link is not from a conditional link by traversing the grid to source nodes, and generating code for constant node values; and generating value code in the executeleaf functions for field nodes by traversing grid to source nodes, and generating code for constant node values.

13. The method of claim 1, wherein generating code according to the hierarchy match list comprises:
    generating a code header for a root node;
    generating a code trailer for the root node;
    processing target record nodes in a preexecuteparent function, a postexecuteparent function, and an executeleaf function; and
    processing field nodes in the executeleaf function.

14. The method of claim 1, wherein generating code according to the hierarchy match list comprises creating an XSL style sheet representation of the mapping.

15. The method of claim 1, wherein the method is performed by computer-executable instructions that are stored on computer-readable media.

16. The method of claim 1, wherein the method is performed by computer-executable instructions that are transmitted by an electrical signal.

17. A method of generating code representing a mapping between a source schema and a target schema, the source schema comprising a source tree having a source node and the target schema comprising a target tree having a target node, the method comprising:
    initializing node dependencies memory comprising:
        allocating memory for a compiler node;
        associating the compiler node with the target node;
        allocating memory for compiler variable classes; and
        associating compiler variable classes with functoids;
    determining source node dependencies for the target node by tracing from the target node through the mapping to the source schema, wherein the mapping comprises defined data transformations from the source schema to the target schema;
    matching hierarchy by generating a hierarchy match list for the target node, wherein matching hierarchy by generating a hierarchy match list for the target node comprises:
        creating a hierarchy match list for the target node if the target node has a source loop path node;
        determining a consolidated compiler link option using links on target node dependencies; and
        matching hierarchy according to the consolidated compiler link option; and
    generating code according to the hierarchy match list.

18. A method of generating code representing a mapping between a source schema and a target schema, the source schema comprising a source tree having a source node and the target schema comprising a target tree having a target node, the method comprising:
    initializing node dependencies memory comprising:
        allocating memory for a compiler node;
        associating the compiler node with the target node;
        allocating memory for compiler variable classes; and
        associating compiler variable classes with functoids;
    determining source node dependencies for the target node by tracing from the target node through the mapping to the source schema, wherein the mapping comprises defined data transformations from the source schema to the target schema:
    matching hierarchy by generating a hierarchy match list for the target node; and
    generating code according to the hierarchy match list, wherein generating code according to the hierarchy match list comprises:
    generating a code header for a root node;
    generating a code trailer for the root node;
    processing target record nodes in a preexecuteparent function, a postexecuteparent function, and an executeleaf function, wherein processing target record nodes in a preexecuteparent function, a postexecuteparent function, and an executeleaf function comprises:
        generating <xsl:for-each> code in the preexecuteparent function using the hierarchy match list;
        generating <xsl:if> code in the preexecuteparent function if there is an incoming link from a conditional functoid;
        generating a start tag code for the target record node in the preexecuteparent function;
        generating </xsl:if> code in the postexecuteparent function for record nodes if there is an incoming link from a conditional functoid;
        generating <xsl:value-of> code in the postexecuteparent function for record nodes if the incoming link is not from a conditional link by traversing a grid to source nodes, and generating code for constant node values;
        generating </xsl:for-each> code in the postexecuteparent function for record nodes using the hierarchy match list;
        generating <xsl:for-each> code in the executeleaf function for leaf record nodes using the hierarchy match list;
        generating <xsl:if> code in the executeleaf function for leaf record nodes if there is an incoming link from a conditional functoid;
        generating a start tag code in the executeleaf function for leaf records;
        generating <xsl:if> code in the executeleaf function for leaf record nodes if there is an incoming link from a conditional functoid;
        generating <xsl:value-of> code in the executeleaf function for leaf record nodes if the incoming link is not from a conditional link by traversing the grid to source nodes, and generating code for constant node values; and
        generating <xsl:value-of> code in the executeleaf function for field nodes by traversing grid to source nodes, and generating code for constant node values; and
    processing field nodes in the executeleaf function.

19. A method of generating code representing a mapping between a source schema and a target schema, the source schema comprising a source tree having a source node and the target schema comprising a target tree having a target node, the method comprising:
    initializing node dependencies memory comprising:
        allocating memory for a compiler node;
        associating the compiler node with the target node;
        allocating memory for compiler variable classes; and
        associating compiler variable classes with functoids;
    determining source node dependencies for the target node by tracing from the target node through the mapping to the source schema, wherein the mapping comprises defined data transformations from the source schema to the target schema;

matching hierarchy by generating a hierarchy match list for the target node;

generating code according to the hierarchy match list, wherein generating code according to the hierarchy match list comprises:
- generating a code header for a root node;
- generating a code trailer for the root node;
- processing target record nodes in a preexecuteparent function, a postexecuteparent function, and an executeleaf function, wherein processing target record nodes in a preexecuteparent function, a postexecuteparent function, and an executeleaf function comprises:
  - generating looping start code in the preexecuteparent function using the hierarchy match list;
  - generating conditional start code in the preexecuteparent function if there is an incoming link from a conditional functoid;
  - generating a start tag code for the target record node in the preexecuteparent function;
  - generating conditional end code in the postexecuteparent function for record nodes if there is an incoming link from a conditional functoid;
  - generating value code in the postexecuteparent function for record nodes if the incoming link is not from a conditional link by traversing a grid to source nodes, and generating code for constant node values;
  - generating looping end code in the postexecuteparent function for record nodes using the hierarchy match list;
  - generating looping start code in the executeleaf function for leaf record nodes using the hierarchy match list;
  - generating conditional start code in the executeleaf function for leaf record nodes if there is an incoming link from a conditional functoid;
  - generating a start tag code in the executeleaf function for leaf records;
  - generating conditional end code in the executeleaf function for leaf record nodes if there is an incoming link from a conditional functoid;
  - generating value code in the executeleaf function for leaf record nodes if the incoming link is not from a conditional link by traversing the grid to source nodes, and generating code for constant node values; and
  - generating value code in the executeleaf function for field nodes by traversing grid to source nodes, and generating code for constant node values; and
- processing field nodes in the executeleaf function.

20. A method for compiling a mapping between a source schema having source nodes associated therewith, and a target schema having target nodes associated therewith, comprising:

determining source node dependencies for at least one target node by tracing from the at least one target node through the mapping to the source schema, wherein determining source node dependencies comprises picking a source loop path for each target node, and detecting multiple source loop paths and wherein the mapping comprises defined data transformations from the source schema to the target schema;

matching hierarchy by generating a hierarchy match list for the at least one target node; and generating code according to the hierarchy match list.

21. The method of claim 20, further comprising generating a compiler error if multiple source loop paths are detected.

22. The method of claim 21, wherein the method is performed by computer-executable instructions that are stored on computer-readable media.

23. The method of claim 21, wherein the method is performed by computer-executable instructions that are transmitted by an electrical signal.

24. The method of claim 20, wherein matching hierarchy comprises one of flattening, top-down, and bottom-up matching.

25. The method of claim 20, wherein the source schema and the target schema are XML schemas.

26. The method of claim 20, wherein generating code comprises creating an XSL style sheet representation of the mapping.

27. The method of claim 20, further comprising:
- initializing node dependencies memory prior to determining source dependencies; and
- freeing node dependencies memory after generating code.

28. The method of claim 20, further comprising:
- initializing node dependencies memory comprising:
  - allocating memory for a compiler node;
  - associating the compiler node with the target node;
  - allocating memory for compiler variable classes; and
  - associating compiler variable classes with functoids.

29. The method of claim 20, wherein generating code according to the hierarchy match list comprises:
- generating a code header for a root node;
- generating a code trailer for the root node;
- processing target record nodes in a preexecuteparent function, a postexecuteparent function, and an executeleaf function; and
- processing filed nodes in the executeleaf function.

30. The method of claim 20, wherein matching hierarchy by generating a hierarchy match list for the at least one target node comprises:
- creating a hierarchy match list for the at least one target node if the at least one target node has a source loop path node;
- determining a consolidated compiler link option using links on target node dependencies; and
- matching hierarchy according to the consolidated compiler link option.

31. The method of claim 20, wherein the method is performed by computer-executable instructions that are stored on computer-readable media.

32. The method of claim 20, wherein the method is performed by computer-executable instructions that are transmitted by an electrical signal.

* * * * *